United States Patent
Ishikawa

(10) Patent No.: US 11,542,415 B2
(45) Date of Patent: Jan. 3, 2023

(54) HIGH-FREQUENCY DIELECTRIC HEATING ADHESIVE SHEET, AND ADHESION METHOD IN WHICH SAME IS USED

(71) Applicant: LINTEC CORPORATION, Tokyo (JP)

(72) Inventor: Masakazu Ishikawa, Tokyo (JP)

(73) Assignee: LINTEC CORPORATION, Tokyo (JP)

(\*) Notice: Subject to any disclaimer, the term of this patent is extended or adjusted under 35 U.S.C. 154(b) by 543 days.

(21) Appl. No.: 16/500,390

(22) PCT Filed: Mar. 30, 2018

(86) PCT No.: PCT/JP2018/013662
§ 371 (c)(1),
(2) Date: Oct. 2, 2019

(87) PCT Pub. No.: WO2018/186297
PCT Pub. Date: Oct. 11, 2018

(65) Prior Publication Data
US 2020/0087541 A1    Mar. 19, 2020

(30) Foreign Application Priority Data
Apr. 3, 2017   (JP) .............................. JP2017-073419

(51) Int. Cl.
*C09J 7/29*       (2018.01)
*C09J 7/30*       (2018.01)
(Continued)

(52) U.S. Cl.
CPC ................... *C09J 7/29* (2018.01); *B32B 7/12* (2013.01); *B32B 29/002* (2013.01);
(Continued)

(58) Field of Classification Search
CPC ...... B32B 2255/12; B32B 27/00; B32B 27/06; B32B 27/08; B32B 27/10; B32B 29/002;
(Continued)

(56) References Cited

U.S. PATENT DOCUMENTS 3,900,360 A  *  8/1975  Leatherman ............ B32B 27/08
                                                          156/272.4
3,925,126 A  *  12/1975 Leatherman .......... B42C 13/006
                                                          412/37
(Continued)

FOREIGN PATENT DOCUMENTS

CN          101490146 A       7/2009
CN          102511060 A       6/2012
(Continued)

OTHER PUBLICATIONS

Dole, M. and Wunderlich, B. "Melting Points and Heats of Fusion of Polymers and Copolymers," May 22, 1959, Die Makromolekulare Chemie, 34 (1), pp. 29-49. (Year: 1959).*
(Continued)

*Primary Examiner* — Philip C Tucker
*Assistant Examiner* — Brian R Slawski
(74) *Attorney, Agent, or Firm* — McDermott Will & Emery LLP

(57) ABSTRACT

A high-frequency dielectric heating adhesive sheet requires no releasable sheet, exhibiting excellent handleability and workability to an adherend even when a size of the high-frequency dielectric heating adhesive sheet is large, and an adhesion method of the high-frequency dielectric heating adhesive sheet. The high-frequency dielectric heating adhesive sheet includes a sheet-shaped base material and a high-frequency dielectric adhesive layer containing a thermoplastic resin as a component A and a dielectric filler as a component B.

8 Claims, 8 Drawing Sheets

(51) Int. Cl.
| | |
|---|---|
| *B32B 7/12* | (2006.01) |
| *B32B 29/00* | (2006.01) |
| *B32B 37/12* | (2006.01) |
| *C09J 11/04* | (2006.01) |
| *B29C 65/04* | (2006.01) |
| *B29C 65/14* | (2006.01) |
| *B29C 65/36* | (2006.01) |
| *B29C 65/00* | (2006.01) |
| *B29C 65/48* | (2006.01) |
| *B32B 27/06* | (2006.01) |

(52) U.S. Cl.
CPC .............. *B32B 37/1207* (2013.01); *C09J 7/30* (2018.01); *C09J 11/04* (2013.01); *B29C 65/04* (2013.01); *B29C 65/1425* (2013.01); *B29C 65/3612* (2013.01); *B29C 65/4815* (2013.01); *B29C 65/4885* (2013.01); *B29C 66/7332* (2013.01); *B29C 66/73143* (2013.01); *B32B 27/06* (2013.01); *B32B 2255/12* (2013.01); *C09J 2301/408* (2020.08)

(58) Field of Classification Search
CPC ...... B32B 37/1207; C08K 3/013; C08K 3/22; C09J 11/04; C09J 201/00; C09J 2301/312; C09J 2301/408; C09J 5/06; C09J 7/29; C09J 7/30; B29C 65/04; B29C 65/14; B29C 65/1425; B29C 65/48; B29C 65/4815; B29C 65/4865; B29C 65/4875; B29C 65/4885; B29C 65/72; B29C 65/3612
USPC ............. 156/60, 71, 242, 246, 272.2, 272.4, 156/273.3, 275.5, 277, 308.2, 309.6; 428/343, 345, 347, 349, 354, 355 R, 356
See application file for complete search history.

(56) References Cited

U.S. PATENT DOCUMENTS

| | | | | |
|---|---|---|---|---|
| 4,126,464 | A | 11/1978 | Dann | |
| 4,940,894 | A * | 7/1990 | Morters | H01T 19/00 422/186.04 |
| 6,048,599 | A * | 4/2000 | Chu | B29C 66/7392 156/244.17 |
| 2006/0062948 | A1* | 3/2006 | Kalishek | G09F 3/0292 428/36.9 |
| 2009/0127253 | A1* | 5/2009 | Stark | B29C 66/91443 219/660 |
| 2011/0104496 | A1* | 5/2011 | Cook | C08K 3/01 428/407 |
| 2013/0313968 | A1* | 11/2013 | Wagner | C08G 18/722 313/503 |
| 2016/0137888 | A1* | 5/2016 | Li | C09J 151/006 523/451 |

FOREIGN PATENT DOCUMENTS

| | | | |
|---|---|---|---|
| EP | 0331765 | A1 * | 9/1989 |
| JP | S54-004933 | A | 1/1979 |
| JP | H04-15282 | A | 1/1992 |
| JP | H08-072055 | A | 3/1996 |
| JP | H08-258173 | A | 10/1996 |
| JP | H10-258477 | A | 9/1998 |
| JP | 2000-289113 | A | 10/2000 |
| JP | 2001-226533 | A | 8/2001 |
| JP | 2001-260231 | A | 9/2001 |
| JP | 2004-181969 | A | 7/2004 |
| JP | 2009-538971 | A | 11/2009 |
| JP | 2012-251030 | A | 12/2012 |
| JP | 2013-231256 | A | 11/2013 |
| JP | 2014-037489 | A | 2/2014 |
| JP | 2015-151493 | A | 8/2015 |
| JP | 6097914 | B2 | 3/2017 |
| WO | 2015/193557 | A1 | 12/2015 |

OTHER PUBLICATIONS

Carraher, Charles E., Jr.,"Solubility parameters of selected polymers," in CRC Handbook of Chemistry and Physics, 102nd Edition (Internet Version 2021), John R. Rumble, ed., CRC Press. (Year: 2021).*

Feng Fei Peng, "Materials and Social Advances," Shanghai University Press, First edition, Sep. 2003, 3 pages, a concise explanation of relevance can be found in the English translation of the Chinese Office Action dated Feb. 19, 2021.

Chang Guanjun, "Rubber Regular Data Quick Survey Handbook," National Defense Industry Publishing Co., Ltd., First edition, Oct. 2012, 3 pages, a concise explanation of relevance can be found in the English translation of the Chinese Office Action dated Feb. 19, 2021.

Chinese Office Action issued in corresponding Chinese Patent Application No. 201880023332.8, dated Feb. 19, 2021, with English translation.

International Search Report issued in corresponding International Patent Application No. PCT/JP2018/013662, dated Jul. 3, 2018, with English translation.

European Search Report issued in corresponding European Patent Aplication No. 18781545.1, dated Dec. 7, 2020.

* cited by examiner

HIGH-FREQUENCY DIELECTRIC HEATING ADHESIVE SHEET, AND ADHESION METHOD IN WHICH SAME IS USED

CROSS REFERENCE

This application is the U.S. National Phase under 35 U.S.C. § 371 of International Application No. PCT/JP2018/013662, filed on Mar. 30, 2018, which claims the benefit of Japanese Patent Application No. 2017-073419, filed Apr. 3, 2017, the entire contents of each are hereby incorporated by reference.

TECHNICAL FIELD

The present invention relates to a high-frequency dielectric heating adhesive sheet, and an adhesion method of the high-frequency dielectric heating adhesive sheet.

More specifically, the invention relates to a high-frequency dielectric heating adhesive sheet, which requires no releasable sheet, exhibiting excellent handleability and workability to an adherend even when a size of the high-frequency dielectric heating adhesive sheet is large, and an adhesion method of the high-frequency dielectric heating adhesive sheet requiring no releasable sheet.

BACKGROUND ART

In recent years, an adhesive sheet without a releasable sheet has been proposed in various forms of adhesive sheet products.

For instance, a liner-less thermal recording label having a strong adhesive force to an adherend (e.g., vinyl chloride wrap film) and having an excellent blocking-resistance in a rolled state has been proposed (see Patent Literature 1).

More specifically, the thermal recording label includes: a support; and a heat sensitive layer layered on the support, the heat sensitive layer including: a first heat sensitive adhesive layer containing at least one of a thermoplastic resin, a tackifier or a solid plasticizer; and a second heat sensitive adhesive layer, the first and second heat sensitive adhesive layers being sequentially layered on the support, in which a content ratio of the solid plasticizer in the second heat sensitive adhesive layer is higher than a content ratio of the solid plasticizer in the first heat sensitive adhesive layer.

Moreover, a liner-less label having an excellent automatic labeler adequacy has been proposed (see Patent Literature 2).

More specifically, the liner-less label includes: a support; a releasable layer that serves as an outermost layer of a first side of the support; and an adhesive layer that serves as an outermost layer of a second side of the support, in which the adhesive layer is provided by an ultraviolet crosslinking acrylic hot-melt adhesive and a glass transition temperature of the adhesive layer is −40 degrees C. or less.

CITATION LIST

Patent Literature(s)

Patent Literature 1: JPH10-2158477 A (Claims etc.)
Patent Literature 2: JP2013-231256 A (Claims etc.)

SUMMARY OF THE INVENTION

Problem(S) to be Solved by the Invention

Both of the typical adhesive sheets without a releasable sheet disclosed in Patent Literatures 1 and 2 include a plurality of heat sensitive adhesive layers or a plurality of adhesive layers.

Accordingly, when the adhesive sheets having the above heat sensitive adhesive layers or the like are formed to have a large area, it is difficult to accurately position the adhesive sheets to a predetermined adherend and it takes an excessively long time to apply the adhesive sheets to the adherend.

Moreover, although the typical adhesive sheets without a releasable sheet include the heat sensitive adhesive layers or the like, Patent Literatures 1 and 2 are silent on a content of a dielectric filler. In other words, judging from such an arrangement of the heat sensitive adhesive layer and the like, the typical adhesive sheets cannot adhere to the adherend through high-frequency dielectric heating.

Accordingly, as a result of dedicated study on the typical problems, the inventors have found that a high-frequency dielectric heating adhesive sheet provided by combining a sheet-shaped base material and a high-frequency dielectric adhesive layer having no surface tack can omit a releasable sheet, and, consequently, the high-frequency dielectric heating adhesive sheet can exhibit excellent handleability and workability and provide a favorable adhesive force to various adherends through high-frequency dielectric heating (hereinafter, sometimes simply referred to as dielectric heating) for a relatively short time. The inventors thus have completed the invention.

Specifically, an object of the invention is to provide a high-frequency dielectric heating adhesive sheet including a sheet-shaped base material and a predetermined high-frequency dielectric adhesive layer in combination, the high-frequency dielectric heating adhesive sheet exhibiting excellent handleability and workability and an excellent high-frequency dielectric heating adhesiveness to various adherends, and to provide an adhesion method of the high-frequency dielectric heating adhesive sheet.

Means for Solving the Problem(s)

An aspect of the invention provides high-frequency dielectric heating adhesive sheet including a sheet-shaped base material and a high-frequency dielectric adhesive layer, in which the high-frequency dielectric adhesive layer includes: a thermoplastic resin as a component A; and a dielectric filler as a component B. According to the aspect of the invention, the above problems can be solved.

Specifically, since the high-frequency dielectric heating adhesive sheet has a predetermined high-frequency dielectric adhesive layer having no surface tack, a releasable sheet is not required.

Accordingly, even when the high-frequency dielectric heating adhesive sheet is enlarged in size, handleability and workability of the high-frequency dielectric heating adhesive sheet are excellent and a favorable adhesive force of the high-frequency dielectric heating adhesive sheet to an adherend having a large surface undulation is obtainable through a dielectric heating for a short time.

In the above aspect, the high-frequency dielectric adhesive layer of the high-frequency dielectric heating adhesive sheet preferably satisfies a condition (i) as follows: (i) heat of fusion measured according to JIS K 7121 (1987) is a value in a range from 1 to 80 J/g.

Since the high-frequency dielectric heating adhesive sheet has a predetermined heat of fusion, a favorable adhesive force of the high-frequency dielectric heating adhesive sheet is reliably obtainable through the dielectric heating for a shorter time.

In the above aspect, the high-frequency dielectric adhesive layer of the high-frequency dielectric heating adhesive sheet preferably satisfies a condition (ii) as follows: (ii) a melting point or a softening point measured by a method according to JIS K 7121 (1987) is a value in a range from 80 to 200 degrees C.

Since the high-frequency dielectric heating adhesive sheet has a predetermined melting point or softening point, a favorable balance is achievable between heat resistance (high-temperature creep resistance) under use environments and adhesiveness in the dielectric heating.

In the above aspect, the high-frequency dielectric adhesive layer of the high-frequency dielectric heating adhesive sheet preferably contains the first thermoplastic resin having a predetermined solubility parameter ($\delta 1$) as the component A and the second thermoplastic resin having a solubility parameter ($\delta 2$) larger than that of the first thermoplastic resin.

Since the high-frequency dielectric adhesive layer contains a plurality of thermoplastic resins, the high-frequency dielectric heating adhesive sheet is applicable to more extensive adherends.

Moreover, since the high-frequency dielectric adhesive layer contains the plurality of thermoplastic resins, flexibility and a mechanical property of the high-frequency dielectric heating adhesive sheet are adjustable to a desired range.

In the above aspect, a content of the component B is preferably a value in a range from 5 parts by mass to 800 parts by mass relative to 100 parts by mass of the component A.

By thus containing the dielectric filler (component B) at a predetermine ratio relative to the thermoplastic resin, the high-frequency dielectric heating adhesive sheet can be made transparent and improved in a predetermined handleability.

In addition, the high-frequency dielectric adhesive layer can reliably provide more favorable adhesiveness through the dielectric heating for a short time.

In the above aspect, a mean particle size of the component B measured according to JIS Z 8819-2 (2001) is preferably a value in a range from 1 to 30 μm.

By thus controlling the mean particle size of the component B to a predetermined range, the filler is more polarized because of the increase in the polarizable distance inside the filler, so that the inversion motion caused when a high-frequency wave is applied is intensified. Accordingly, the dielectric heating (heat generation) of the high-frequency dielectric heating adhesive sheet containing the high-frequency dielectric adhesive layer is controllable and improvable.

In the above aspect, the component B is preferably zinc oxide.

With the component B being zinc oxide, even when a relatively small amount of the component B is blended with the component A, the high-frequency dielectric heating adhesive sheet containing the high-frequency dielectric adhesive layer can exhibit a predetermined heat generation effect in the dielectric heating.

Moreover, with the component B being zinc oxide, the component B can be evenly dispersed in the component A, thereby achieving more favorable balance between transparency of the high-frequency dielectric heating adhesive sheet containing the high-frequency dielectric adhesive layer and adhesiveness thereof in the dielectric heating.

Another aspect of the invention provides an adhesion method of a high-frequency dielectric adhesive sheet including a sheet-shaped base material and a high-frequency dielectric adhesive layer, the adhesion method including: (1) forming the high-frequency dielectric adhesive layer on the sheet-shaped base material to prepare the high-frequency dielectric heating adhesive sheet, the high-frequency dielectric adhesive layer comprising a thermoplastic resin as a component A and a dielectric filler as a component B; and (2) subjecting the high-frequency dielectric heating adhesive sheet to high-frequency dielectric heating to adhere on an adherend.

Specifically, according to the adhesion method of the high-frequency dielectric heating adhesive sheet, the high-frequency dielectric adhesive layer has no surface tack, so that a releasable sheet is not required, and consequently a removal operation of a releasable sheet is not required and a processing can be shortened.

Accordingly, with the above arrangement of the high-frequency dielectric heating adhesive sheet, the high-frequency dielectric heating adhesive sheet can exhibit excellent handleability and workability, can be applied to various adherends, and can provide a favorable adhesive force to an adherend having a large surface undulation through the dielectric heating for a short time.

BRIEF DESCRIPTION OF DRAWING(S)

DESCRIPTION OF EMBODIMENT(S)

First Exemplary Embodiment

Figure 1A:
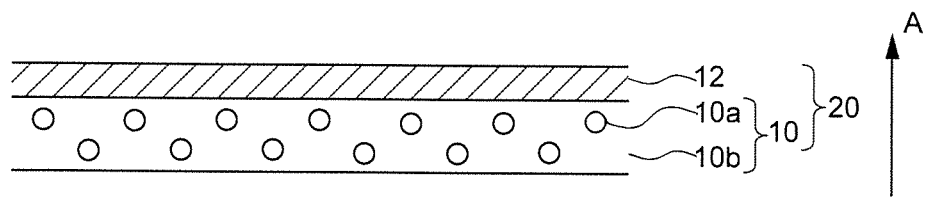
FIG. 1A is an illustration for showing an arrangement example of a high-frequency dielectric heating adhesive sheet of the invention.

A high-frequency dielectric heating adhesive sheet in a first exemplary embodiment at least includes a sheet-shaped base material and a high-frequency dielectric adhesive layer containing a thermoplastic resin as a component A and a dielectric filler as a component B.

An arrangement, shape and the like of the high-frequency dielectric heating adhesive sheet in the first exemplary embodiment will be specifically described below with reference to the attached drawings (FIGS. 1A to 8) as needed.

1. Sheet-Shaped Base Material (1) Type

A type of the sheet-shaped base material is not particularly limited. Various sheet-shaped base materials of a single layer or multiple layers are usable depending on usage, a form in use, and the like.

The sheet-shaped base material is exemplified by a paper base material such as high-quality paper, art paper, coated paper, kraft paper, glassine paper, and impregnated paper.

Moreover, a laminated paper obtained by layering a thermoplastic resin (e.g., a polyethylene resin) on the paper base material is also preferable as the sheet-shaped base material.

Further, the sheet-shaped base material may be a synthetic paper. Such a synthetic paper advantageously has a water resistance superior to that of the paper base material and printability superior to that of a typical resin film. As the synthetic paper, for instance, a cavity-containing synthetic paper (for instance, product name: CRISPER (manufactured by Toyobo Co., Ltd.)), a synthetic paper by internal paper-making method (for instance, product name: YUPO (manufactured by YUPO CORPORATION), a synthetic paper by a surface coating method (for instance, product name: PEACH COAT (manufactured by Nisshinbo Industries Inc.), and a synthetic paper by spunbond method (for instance, product name: TYVEK (manufactured by DuPont de Nemours, Inc.) are commercially available and suitably usable.

Further, the sheet-shaped base material is preferably a single one or a combination of two or more resin films, examples of which include a polyvinyl chloride resin film (sometimes containing a plasticizer), polyolefin resin film (including polyethylene resin film, cycloolefin resin film, and norbornene resin film), polyester resin (including a polyethylene terephthalate resin film, polybutylene naphthalate resin film, polyethylene naphthalate resin film and the like), acrylic resin film, polyamide resin film, polyurethane resin film, silicone resin film, triacetylcellulose resin film, polystyrene resin film, polyvinyl alcohol resin film, ABS resin film, polycarbonate resin film, polyacetal resin film, and rayon resin film.

Additionally, as modifications of the above resin film, the sheet-shaped base material of a foam resin type, examples of which include a polyester foam resin film, urethane foam resin film, and polystyrene foam resin film, is also suitably usable.

The resin film used for the sheet-shaped base material may contain various additives such as a plasticizer, stabilizer, filler made of various organic and inorganic materials, coloring agent (including a pigment and a dye), antioxidant, ultraviolet absorber, flame retardant, metallic soap, aromatic substance, lubricant, and surfactant for a predetermined purpose of providing the respective functions of the additives.

Further, the sheet-shaped base material may be cloth fabrics such as a woven fabric, an unwoven fabric, or a metal foil such as an aluminum foil, a stainless steel foil, and a copper foil.

When the sheet-shaped base material is a conductive material such as a metal foil, a high-frequency wave is applied from a side of an adherend, not from a side of the sheet-shaped base material. In other words, the high-frequency dielectric adhesive layer is interposed between the conductive sheet-shaped base material and a high-frequency application device, so that the high-frequency dielectric adhesive layer can be heated.

The above-described sheet-shaped base material may be in a form of a single base material made of a single constituent material or in a form of a composite base material provided by layering two or more different layers.

(2) Thickness

A thickness of the sheet-shaped base material is usually preferably a value in a range from 10 to 1,000 μm.

This is because a mechanical strength may be drastically decreased or handleability may be deteriorated when the thickness of the sheet-shaped base material is a value less than 10 μm.

On the other hand, when the thickness of the sheet-shaped base material is a value more than 1,000 μm, it may be difficult to wind the sheet-shaped base material into a roll.

Accordingly, although depending on usage and the like of the high-frequency dielectric heating adhesive sheet, the thickness of the sheet-shaped base material is usually more preferably a value in a range from 20 to 800 μm, further preferably from 30 to 500 μm, most preferably from 50 to 300 μm.

2. High-Frequency Dielectric Adhesive Layer (1) Component A: Thermoplastic Resin Type of Component A A type of a thermoplastic resin as the component A of the high-frequency dielectric adhesive layer is not particularly limited. For instance, because of being easily meltable and having a predetermined heat resistance, at least one of a polyolefin resin, olefin thermoplastic elastomer, styrene thermoplastic elastomer, polyamide resin, polyvinyl acetate resin, polyacetal resin, polycarbonate resin, polyacryl resin, polyamide resin, polyimide resin, polyvinyl acetate resin, phenoxy resin or polyester resin is preferable.

More specifically, the polyolefin resin is exemplified by a single one or a combination of two or more of: a resin made of homopolymers such as polyethylene, polypropylene, polybutene, and polymethyl pentene; and an α-olefin resin made of copolymers such as ethylene, propylene, butene, hexene, octene, and 4-methyl pentene.

Among the above examples of the polyolefin resin, the polypropylene resin is particularly preferable because of an easy adjustment of a melting point or a softening point, a low price, and excellent mechanical strength and transparency.

In the polypropylene resin used in the exemplary embodiment, preferably, a dielectric constant at 1 MHz (hereinafter sometimes represented by ε'/1 MHz) is set at a value in a range from 2.2 to 2.6, a dissipation factor at 1 MHz (hereinafter represented by tan δ/1 MHz) is set at a value in a range from 0.0005 to 0.0018, and further loss factor is set at about 0.0047.

In a crystalline polypropylene resin used in the exemplary embodiment, preferably, a dielectric constant (ε'/1 MHz) is set at a value in a range from 2.8 to 4.1, a dissipation factor (tan δ/1 MHz) is set at a value in a range from 0.005 to 0.026, and further loss factor is set at a value in a range from 0.0168 to 0.11.

Melting Point or Softening Point of Component A

The melting point or the softening point of the component A of the high-frequency dielectric adhesive layer is preferably a value in a range from 80 to 200 degrees C.

When the component A is a crystalline resin, by defining a melting point measured by a differential scanning calorimeter (DSC) or the like (i.e., a temperature at which a crystal part is melted) at a value falling within a predetermined range, heat resistance under use environments can be favorably balanced against adhesiveness through the dielectric heat treatment.

More specifically, using the differential scanning calorimeter, 10 mg of a measurement sample (thermoplastic resin) is heated to 250 degrees C., then cooled down to 25 degrees C. at a temperature decreasing rate of 10 degrees C./minute for crystallization, again heated at a temperature increasing rate of 10 degrees C./minute to be melted. A peak temperature of a melt peak observed on a DSC chart (fusion curve) can be determined as a melting point of the measurement sample.

When the component A is an amorphous resin, by defining a softening point (glass transition point) measured according to a ring and ball method or the like as a temperature at which an amorphous part is melted at a value falling within a predetermined range, heat resistance can also be favorably balanced against adhesiveness through the dielectric heat treatment.

More specifically, the softening point of the component A can be measured according to JIS K 6863 (1994).

In both of the above cases, when the melting point or the softening point of the component A is a value less than 80 degrees C., the heat resistance sometimes becomes insufficient to excessively restrict the usage of the high-frequency dielectric heating adhesive sheet including the high-frequency dielectric adhesive layer and/or significantly lower the mechanical strength.

On the other hand, when the melting point or the softening point of the component A is a value more than 200 degrees C., sometimes, it takes excessive time that the high-frequency dielectric heating adhesive sheet adheres to an adherend through the dielectric heating, and/or the adhesive force is excessively lowered.

Accordingly, the melting point or the softening point of the thermoplastic resin in a form of the component A is more preferably a value in a range from 100 to 190 degrees C., further preferably in a range from 130 to 180 degrees C.

Although the melting point or the softening point of the component A is preferably obtained by measuring solely the component A forming the high-frequency dielectric adhesive layer, practically, the melting point or the softening point of the high-frequency dielectric heating adhesive sheet including the high-frequency dielectric adhesive layer is measured, and the measured value can be estimated as the melting point or the softening point of the component A.

Average Molecular Weight of Component A

An average molecular weight (weight average molecular weight) of the component A is usually preferably in a range from 5000 to 300000.

This is because the heat resistance and adhesion strength may be drastically decreased when the weight average molecular weight of the component A is a value less than 5000, whereas the adhesiveness may be drastically decreased through the dielectric heating when the weight average molecular weight of the component A is a value more than 300000.

Accordingly, the weight average molecular weight of the component A is more preferably a value in a range from 10000 to 200000, further preferably in a range from 30000 to 100000.

The weight average molecular weight of the component A can be measured, for instance, through intrinsic viscosity method, or gel permeation chromatography method (GPC method) according to JIS K 7367-3 (1999).

Melt Flow Rate of Component A

A melt flow rate (MFR), which is also influenced by the weight average molecular weight, of the component A is usually preferably a value in a range from 1 g/10 min to 300 g/10 min at a load of 2.16 kg at 230 degrees C.

This is because the heat resistance of an adhesive portion is relatively improved when the MFR is equal to or more than 1 g/10 min, whereas a time for adhesion by the dielectric heating can be shortened to provide a stable adhesiveness when the MFR is equal to or less than 300 g/10 min.

Accordingly, the MFR is preferably in a range from 1 g/10 min to 100 g/10 min, more preferably in a range from 1 g/10 min to 50 g/10 min.

The value of the MFR can be measured at 230 degrees C. at 2.16 kg load according to JIS K 7210-1 (2014).

Combination of Plurality of Thermoplastic Resins as Component A

The above-described component A is also preferably formed of a plurality of thermoplastic resins in combination.

For instance, the component is preferably a combination of a component A1 that is a first thermoplastic resin having a predetermined a solubility parameter (δ1) and a component A2 that is a second thermoplastic resin having a solubility parameter (δ2) larger than that of the first thermoplastic resin.

In other words, the high-frequency dielectric heating adhesive sheet having the high-frequency dielectric adhesive layer at least containing the components A1, A2 and B can also favorably adhere on various adherends through the dielectric heating for the shorter time.

Additionally, the high-frequency dielectric heating adhesive sheet with the above arrangement facilitates control of a storage modulus (E'), so that predetermined handleability and flexibility of the high-frequency dielectric heating adhesive sheet is improvable.

Accordingly, the high-frequency dielectric heating adhesive sheet with the above arrangement is easily formed into a long roll without a releasable sheet.

(2) Component B: Dielectric Filler

Type of Component B

A type of a dielectric filler as the component B is not particularly limited as long as the dielectric filler is a high-frequency absorbent filler having a high dielectric loss factor, at which heat can be generated by applying a high-frequency wave having a frequency of 28 MHz or 40 MHz.

Accordingly, the component B is preferably a single one or a combination of two or more of zinc oxide, silicon carbide (SiC), anatase-type titanium oxide, barium titanate, titanic acid zirconic acid barium, lead titanate, potassium niobate, rutile-type titanium oxide, hydrated aluminum silicate, and inorganic substances having crystallization water such as a salt of hydrated alumino silicate with alkali metal or alkaline earth metal.

Among the above examples, zinc oxide and silicon carbide are particularly preferable since zinc oxide and silicon carbide have ample types to be selectable from various shapes and sizes, allow an adhesion property and a mechanical property of the dielectric film to be modified according to usage, and exhibit an excellent heat generation property even at a relatively small content.

Contents

A content of the component B is preferably a value in a range from 5 parts by mass to 800 parts by mass relative to 100 parts by mass of the component A.

This is because, at an excessively small content of the component B, heat generation property becomes poor even when the dielectric heating is applied, so that a melting property of the component A may be excessively lowered, resulting in no tight adhesion.

On the other hand, at an excessively large content of the component B, fluidity of the high-frequency dielectric heating adhesive sheet through the dielectric heating may be excessively lowered.

Accordingly, the content of the component B is more preferably a value in a range from 30 parts by mass to 600 parts by mass relative to 100 parts by mass of the component A, further preferably in a range from 50 parts by mass to 300 parts by mass.

Mean Particle Size

A mean particle size (median diameter: D50) of the component B measured according to JIS Z 8819-2 (2001) is preferably a value in a range from 0.1 to 30 μm.

This is because, when the mean particle size is less than 0.1 μm, the filler is less polarized due to a reduced polarizable distance inside the filler, though depending on the type of the filler. Inversion motion caused when high-frequency wave is applied is thus attenuated to cause excessive decrease in the dielectric heating, sometimes making it difficult that adherends tightly adhere to each other.

Meanwhile, as the mean particle size increases, the filler is more polarized because of the increase in the polarizable distance inside the filler, so that the inversion motion caused when a high-frequency wave is applied is intensified, thereby improving the dielectric heating.

However, when the mean particle size exceeds 30 μm, the distance between neighboring dielectric fillers becomes short and the inversion motion caused when a high-frequency wave is applied is attenuated due to electric charge of the neighboring dielectric fillers, so that the dielectric heating may be excessively reduced and the adherends may less tightly adhere to each other.

Accordingly, the mean particle size of the B component is more preferably a value in a range from 1 to 30 μm, further preferably from 2 to 25 μm, most preferably from 3 to 20 μm.

Herein, with reference to FIG. 2, an influence of the mean particle size of the component B in the high-frequency dielectric adhesive layer will be described in relation to high-frequency adhesiveness provided by using a dielectric heating adhesive film.

Figure 2:
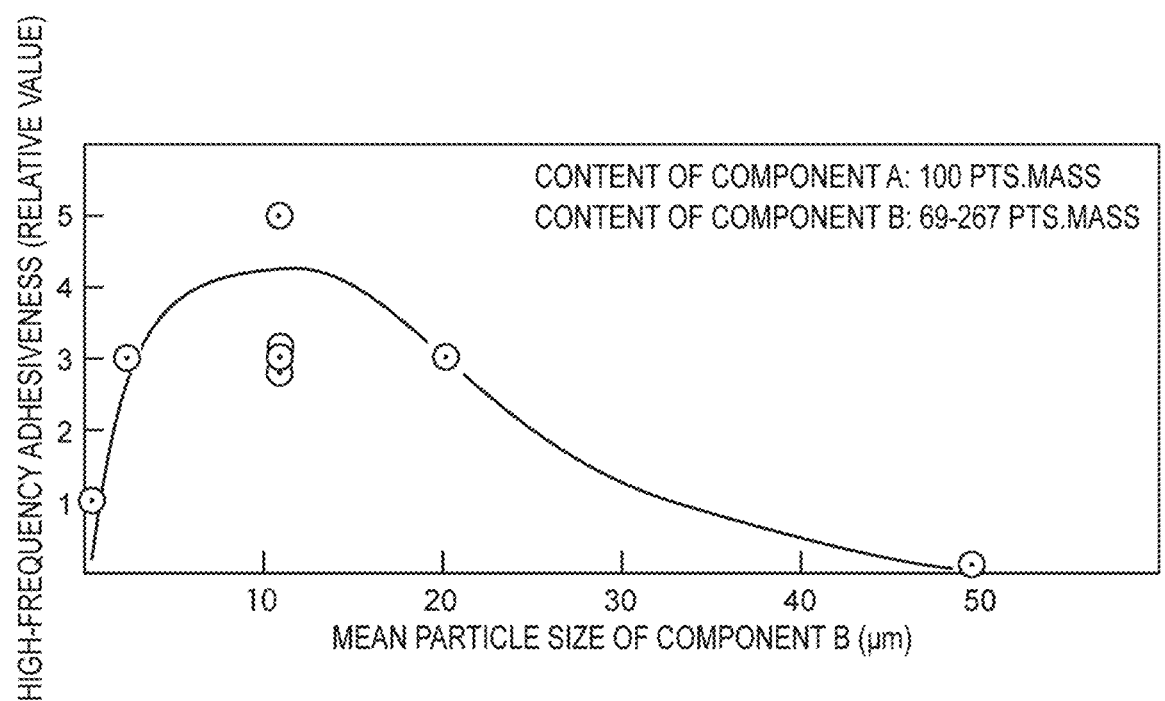
FIG. 2 is an illustration for showing an influence of a mean particle size of a component B on high-frequency adhesiveness provided by using a dielectric heating adhesive film.

In FIG. 2, the abscissa axis shows a value (μm) of the mean particle size of the component B and the ordinate axis shows adhesiveness (relative value).

More specifically, a relative evaluation is shown by 5 points to an evaluation mark A, 3 points to the mark B, 1 point to the mark C, and 0 points to the mark D in accordance with the evaluation described in the later described Example 1.

As is understood from the characteristic curve in FIG. 2, it can be said that an optimum value of the mean particle size of the component B is present with respect to the adhesive force.

Specifically, it can be said that adherends cannot adhere to each other through a high-frequency application when the mean particle size of the component B is as excessively small as 0.4 μm.

In contrast, it can be said that the evaluation of the high-frequency adhesiveness is drastically improved when the mean particle size of the component B is as relatively large as 2 μm.

Further, it can be said that, when the mean particle size of the component B is as considerably large as a value in a range from 10 μm to 20 μm, the evaluation of the high-frequency adhesiveness is almost stable and is far improved relative to the high-frequency adhesiveness when the mean particle size of the component B is excessively small.

On the other hand, it can be said that, when the mean particle size of the component B exceeds 40 μm to become as excessively large as 50 μm, the evaluation of the high-frequency adhesiveness is adversely lowered to be equivalent to the high-frequency adhesiveness when the mean particle size of the component B is excessively small.

Accordingly, the mean particle size of the component B has the optimum value with respect to the high-frequency adhesiveness obtained by the dielectric heating adhesive film. For instance, it can be said that the optimum value is preferably a value in a range from 1 to 30 μm, more preferably from 2 to 20 μm.

Figure 3:
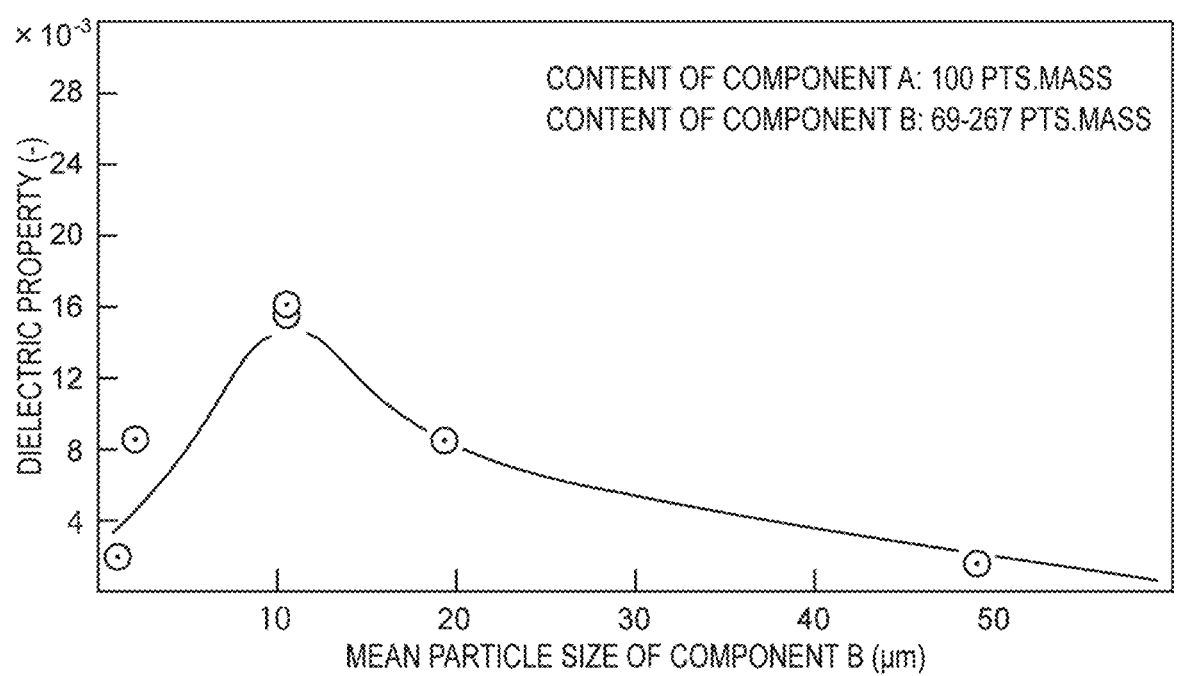
FIG. 3 is an illustration for showing an influence of the mean particle size of the component B on dielectric property (tan $\delta/\epsilon'$) of the high-frequency dielectric adhesive layer.

With reference to FIG. 3, a relationship between the mean particle size of the component B and the dielectric property represented by tan $\delta/\epsilon'$ will be described.

In FIG. 3, the abscissa axis shows a value (μm) of the mean particle size of the component B and the ordinate axis shows the dielectric property (tan $\delta/\epsilon' \times 10^{-3}$).

As is understood from the characteristic curve in FIG. 3, it can be said that an optimum value of the mean particle size of the component B is present with respect to the dielectric property.

Specifically, it is inferred that, when the mean particle size of the component B is as excessively small as 0.4 μm, the dielectric property is very low, so that adherends cannot adhere to each other through a high-frequency application.

In contrast, when the mean particle size of the component B is as relatively large as 2 μm, a value of the dielectric property is drastically increased, exceeding at least 0.005.

Further, when the mean particle size of the component B is around 10 μm, the value of the dielectric property at least falls within a range from 0.008 to 0.01 although having a slight variation.

On the other hand, when the mean particle size of the component B exceeds 10 μm to become about 20 μm, the value of the dielectric property is adversely lowered to be a value below 0.008.

When the mean particle size of the component B exceeds 40 μm to become about 50 μm, the value of the dielectric property is significantly lowered to be a value below 0.002.

Accordingly, the mean particle size of the component B has the optimum value with respect to the dielectric property represented by tan $\delta/\epsilon'$. For instance, it can be said that the optimum value is preferably a value in a range from 1 to 20 µm, more preferably from 2 to 15 µm.

Figure 4:
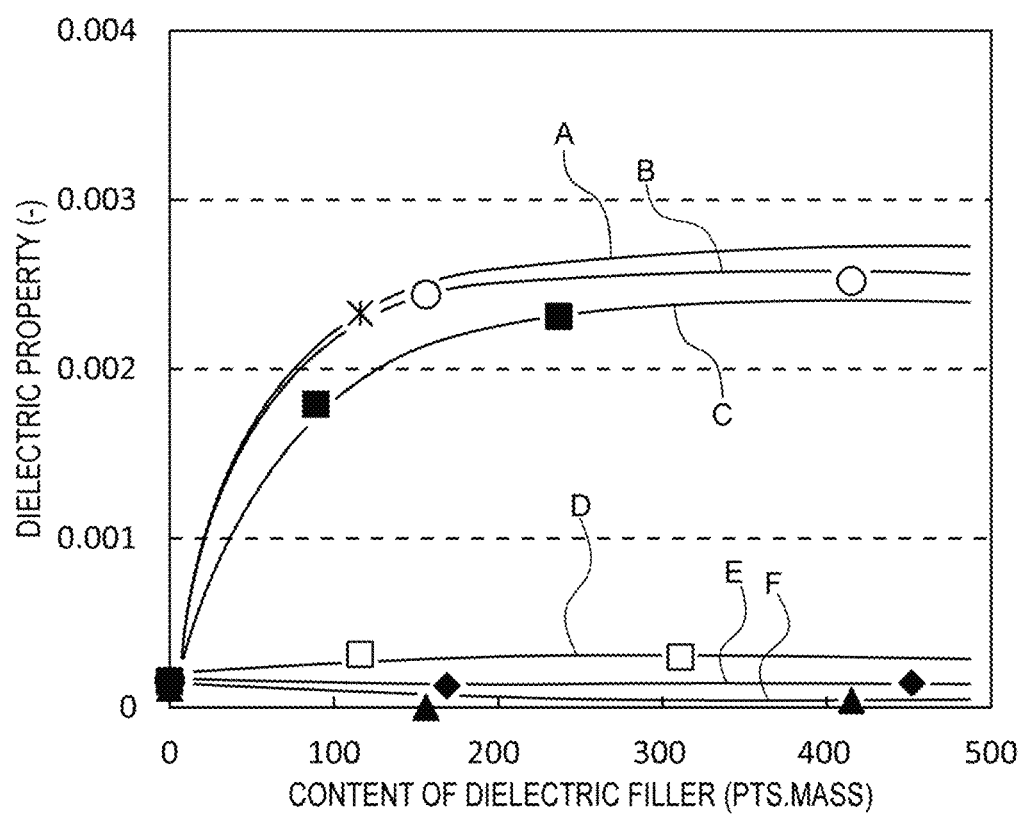
FIG. 4 is an illustration for showing an influence by types (six) and contents (three levels) of the components B on the dielectric property (tan $\delta/\epsilon'$) of the high-frequency dielectric adhesive layer.

With reference to FIG. 4, a relationship between the types (six types in total) and contents (in three levels) of the component B and the dielectric property represented by tan $\delta/\varepsilon'$ will be described.

In FIG. 4, the abscissa axis shows the content (parts by mass) of the component B relative to 100 parts by mass of the component A and the ordinate axis shows a value of the dielectric property represented by tan $\delta/\varepsilon'$.

The characteristic curve A corresponds to $TiO_2$ (anatase-type crystal), the characteristic curve B corresponds to zinc oxide (ZnO), the characteristic curve C corresponds to silicon carbide (SiC), the characteristic curve D corresponds to $TiO_2$ (rutile-type crystal), the characteristic curve E corresponds to barium titanate ($BaTiO_3$), and the characteristic curve F corresponds to zirconium oxide ($ZrO_2$).

As is understood from the characteristic curves A to C in FIG. 4, when the component B is $TiO_2$, ZnO, or SiC, the value of the dielectric property (tan $\delta/\varepsilon'$) is significantly increased in accordance with an increase in the content of the component B up to about 150 parts by mass.

As is understood from the characteristic curves A to C in FIG. 4, when the content of the component B is increased to about 350 parts by mass, the value of the dielectric property (tan $\delta/\varepsilon'$) is further increased, however, tends to be partially saturated.

On the other hand, as is understood from the characteristic curves D to F, when the component B is $TiO_2$ (rutile-type crystal), $BaTiO_3$, or $ZrO_2$, the value of the dielectric property (tan $\delta/\varepsilon'$) is hardly changed even when the content of the component B is increased up to about 150 parts by mass.

Accordingly, the types and contents of the component B have an extremely strong influence on the dielectric property represented by tan $\delta/\varepsilon'$. In order to obtain a relatively high value of the dielectric property, for instance, the content of the component B is more preferably a value in a range from 50 to 500 parts by mass relative to the 100 parts by mass of the component A, more preferably from 100 to 400 parts by mass.

(3) High-Frequency Dielectric Adhesive Layer (3)-1 Components

The high-frequency dielectric adhesive layer may be formed of a single type of a thermoplastic resin as the component A, however, is also preferably formed of two or more thermoplastic resins in combination.

More preferably, for instance, the high-frequency dielectric adhesive layer contains the first thermoplastic resin having a predetermined a solubility parameter ($\delta1$) and the second thermoplastic resin having a solubility parameter ($\delta2$) larger than that of the first thermoplastic resin.

This is because a high-frequency dielectric heating adhesive sheet having such a high-frequency dielectric adhesive layer as containing the plurality of thermoplastic resins is applicable to more extensive adherends.

(3)-2 Thickness

A thickness of the high-frequency dielectric adhesive layer is usually preferably in a range from 10 to 2000 µm.

By thus controlling the thickness of the high-frequency dielectric adhesive layer, the high-frequency dielectric heating adhesive sheet including the high-frequency dielectric adhesive layer is improvable in handleability and is capable of reliably providing a favorable adhesiveness through the dielectric heating even for a short time.

More specifically, the above thickness of the high-frequency dielectric adhesive layer is preferable since, at the thickness of less than 10 µm, the high-frequency dielectric heating adhesive sheet may be drastically deteriorated in handleability and may be difficult to apply to an adherend having surface undulation.

On the other hand, the above upper limit of the thickness of the high-frequency dielectric adhesive layer is preferable since, at the thickness of more than 2000 µm, the time required for the dielectric heating may be excessively prolonged in order to obtain a predetermined adhesive force, and the high-frequency dielectric heating adhesive sheet including the high-frequency dielectric adhesive layer may have an excessively thick thickness, adversely deteriorating handleability.

Accordingly, the thickness of the high-frequency dielectric adhesive layer is more preferably in a range from 20 to 1000 µm, further preferably from 30 to 500 µm.

The high-frequency dielectric adhesive layer is preferably not only a single layer but also a plurality of layers. The total thickness of the high-frequency dielectric adhesive layer in a form of a plurality of layers is preferably, for instance, in a range from 10 to 2000 µm.

(3)-3 Blending Ratio (Component B/Component A)

The high-frequency dielectric adhesive layer preferably contains a resin composition including the components A and B at a blending ratio where the component B is in a range from 5 parts by mass to 800 parts by mass relative to 100 parts by mass of the component A.

By thus containing the dielectric filler (component B) at a predetermined ratio relative to the thermoplastic resin (component A), the high-frequency dielectric adhesive layer, and consequently, the high-frequency dielectric heating adhesive sheet are improvable in handleability and are capable of reliably providing a favorable adhesiveness through the dielectric heating even for a short time.

Accordingly, in the resin composition of the high-frequency dielectric adhesive layer, a value of the blending ratio of the component B is more preferably in a range from 10 parts by mass to 500 parts by mass relative to 100 parts by mass of the component A, further preferably in a range from 30 parts by mass to 300 parts by mass.

(3)-4 Additives

The high-frequency dielectric adhesive layer is preferably added with at least one of additives such as tackifier, plasticizer, wax, coloring agent, antioxidant, ultraviolet absorber, antibacterial agent, coupling agent, viscosity modifier, and organic or inorganic filler other than the dielectric filler.

Specifically, the tackifier and the plasticizer can improve melting and adhesion properties of the high-frequency dielectric heating adhesive sheet.

Examples of the tackifier include rosin derivative, polyterpene resin, aromatic modified terpene resin and hydrogenated products thereof, terpene phenol resin, coumarone-indene resin, aliphatic petroleum resin, and aromatic petroleum resin and hydrogenated products thereof.

Examples of the plasticizer include petroleum process oil such as paraffin process oil, naphthene process oil and aromatic process oil, natural oil such as castor oil and tall oil, diacid dialkyl (e.g. dibutyl phthalate, dioctyl phthalate, and dibutyl adipate), and low-molecular-weight liquid polymer such as liquid polybutene and liquid polyisoprene.

When the additive is added, the content of the additive is typically preferably in a range from 0.1 to 20 mass % of a total amount of the high-frequency dielectric heating adhesive sheet, more preferably in a range from 1 to 10 mass %, further preferably in a range from 2 to 5 mass %, though depending on the type and purpose of the additive.

(3)-5 Dielectric Property

The dielectric property (dissipation factor (tan δ) and a relative permittivity (ε')) of the high-frequency adhesive layer, which may be measured according to JIS C 2138 (2007), can be easily and accurately measured according to an impedance material method.

Specifically, with respect to the high-frequency dielectric adhesive layer at least containing the components A and B, the dielectric property (tan δ/ε'), which is obtained by dividing dissipation factor (tan δ) measured with an impedance material analyzer or the like by relative permittivity (ε') measured in the same manner, is preferably 0.005 or more.

This is because, when the dielectric property is less than 0.005, the high-frequency adhesive layer does not generate heat as desired through the dielectric heating irrespective of the type and the like of the A component, which may make it difficult that the adherends tightly adhere on each other.

However, when the value of the dielectric property becomes excessively large, it may occur that the usable types of the component A and the dielectric filler are excessively limited and/or total light transmissivity may be rapidly reduced.

Accordingly, the dielectric property of the high-frequency dielectric adhesive layer is more preferably in a range from 0.008 to 0.05, further preferably in a range from 0.01 to 0.03.

The dielectric property of the high-frequency dielectric adhesive layer can be calculated as a value of the dielectric property (tan δ/ε') by measuring the relative permittivity (ε') and dissipation factor (tan δ) of the high-frequency dielectric adhesive layer at 23 degrees C. and 40 MHz frequency using an impedance material analyzer E4991 (manufactured by Agilent Technologies, Inc.).

(3)-6 Melting Point or Softening Point

The melting point or the softening point of the high-frequency dielectric adhesive layer is preferably a value in a range from 80 to 200 degrees C.

Herein, the melting point or softening point of the high-frequency dielectric adhesive layer forming the high-frequency dielectric heating adhesive sheet (hereinafter, sometimes simply referred to as "the melting point or softening point of the high-frequency dielectric heating adhesive sheet") can be measured with a differential scanning calorimeter (DSC) or the like.

When the melting point or the softening point of the high-frequency dielectric heating adhesive sheet is a value less than 80 degrees C., high-temperature creep resistance is sometimes significantly reduced due to insufficient heat resistance, impairing preservation stability of the adhering adherend.

On the other hand, when the melting point or the softening point of the high-frequency dielectric heating adhesive sheet is a value more than 200 degrees C., sometimes, it may take excessive time that the high-frequency dielectric heating adhesive sheet adheres in the dielectric heating, and/or adhesive strength may rather be adversely excessively lowered.

Accordingly, the melting point or the softening point of the high-frequency dielectric heating adhesive sheet is more preferably a value in a range from 100 to 190 degrees C., further preferably in a range from 130 to 180 degrees C.

(3)-7 Heat of Fusion

Heat of fusion of the high-frequency dielectric adhesive layer, which is measured according to JIS K 7121 (1987), is a value in a range from 1 to 80 J/g.

This is because the heat of fusion of the high-frequency dielectric adhesive layer forming the high-frequency dielectric heating adhesive sheet (hereinafter, sometimes simply referred to as "heat of fusion of the high-frequency dielectric heating adhesive sheet") defined at a value in a predetermined range can achieve a favorable balance between heat resistance under environments in use or the like and adhesiveness through the dielectric heating.

More specifically, when the heat of fusion is a value of less than 1 J/g, the high-frequency adhesiveness, the adhesive force (tensile shear force), and the high-temperature creep resistance may be significantly reduced due to insufficient heat resistance.

Meanwhile, when the heat of fusion is a value of more than 80 J/g, adhesion through the dielectric heating may take an excessively long time and/or the resultant adhesive force (tensile shear force) may be excessively decreased.

Accordingly, the heat of fusion is thus more preferably a value in a range from 5 to 70 J/g, further preferably from 10 to 60 J/g.

It should be noted that, when a plurality of the melting peaks are present in the resultant DSC chart depending on the content of the additive and the like, the heat of fusion of the high-frequency dielectric heating adhesive sheet can be calculated on a basis of a sum of the plurality of melting peaks.

(3)-8 Viscoelastic Property

With regard to viscoelastic property (dynamic elastic modulus) of the high-frequency dielectric adhesive layer, storage modulus (E') measured at 10 Hz frequency is preferably in a range from $1 \times 10^6$ to $1 \times 10^{10}$ Pa both at a room temperature and at 80 degrees C.

This is because, when the viscoelastic property of the high-frequency dielectric adhesive layer forming the high-frequency dielectric heating adhesive sheet (hereinafter, sometimes simply referred to as "the viscoelastic property of the high-frequency dielectric heating adhesive sheet") is a value of less than $1 \times 10^6$ Pa at a room temperature or at 80 degrees C., the surface of the high-frequency dielectric heating adhesive sheet may become tacky to cause blocking, which makes it difficult to store the high-frequency dielectric heating adhesive sheet in a roll.

On the other hand, when the storage modulus is a value of more than $1 \times 10^{10}$ Pa at a room temperature or at 80 degrees C., the high-frequency dielectric heating adhesive sheet may become brittle to make it difficult to unroll or adhere on an adherend at a high tension.

3. Other Layers (1) Accepting Layer

Figure 1B:
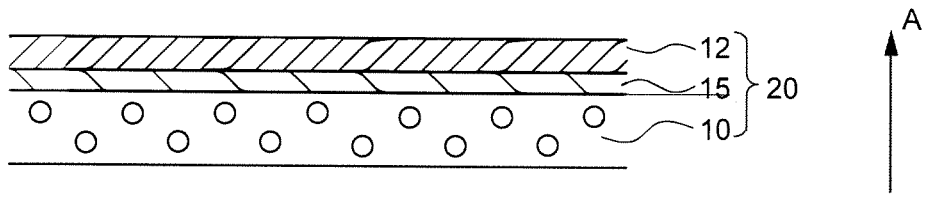
FIG. 1B is an illustration for showing another arrangement example of the high-frequency dielectric heating adhesive sheet of the invention.
Figure 1C:
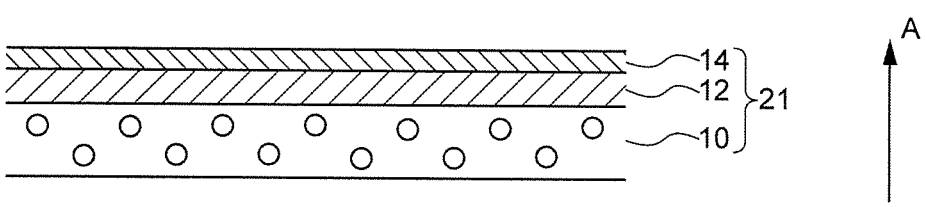
FIG. 1C is an illustration for showing still another arrangement example of the high-frequency dielectric heating adhesive sheet of the invention.
Figure 1D:
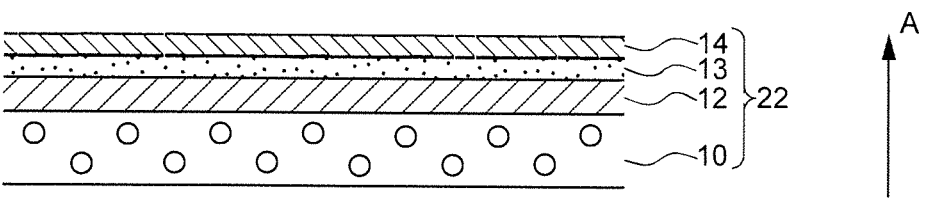
FIG. 1D is an illustration for showing a further arrangement example of the high-frequency dielectric heating adhesive sheet of the invention.

When the high-frequency dielectric heating adhesive sheet is used for printed matters such as a printed label, a decorative material or a marking material (e.g., signboard), the high-frequency dielectric heating adhesive sheet also preferably has an accepting layer 13 on a surface (i.e., an opposite surface from the high-frequency dielectric adhesive layer 10) of the sheet-shaped base material 12 as shown in FIG. 1D.

This is because the accepting layer 13 thus provided on the sheet-shaped base material 12 allows the high-frequency dielectric heating adhesive sheet to be used for the above-described printed matters even when the sheet-shaped base material 12 has an insufficient printability.

Herein, a material forming the accepting layer 13 is not particularly limited, but any material may be selected as needed in consideration of the material of the sheet-shaped base material, ink used for printing, a printing method, and properties of a decorative layer 14 formed on the accepting layer 13.

Specifically, a coating agent, in which an additive (e.g., a filler, pigment, dye, curing agent and coupling agent) and a solvent are blended, is used with a binder in a form of a thermoplastic resin or a thermosetting resin such as a polyester resin, polyurethane resin, and acrylic resin, thereby being applied to the sheet-shaped base material and being dried to provide the accepting layer.

For instance, when the decorative layer 14 is an ink-jet layer, provision of the accepting layer 13 formed of a polyvinyl alcohol resin, polyvinyl acetal resin or the like can prevent an ink-jet coating material from being repelled and the like, so that a stable and strong decorative layer 14 can be formed.

A thickness of the accepting layer 13, which is not particularly limited, may be determined as needed in consideration of types of ink used for printing, a printing method and the like.

Accordingly, the thickness of the accepting layer 13 is usually preferably in a range from 1 to 10 μm.

(2) Decorative Layer

The decorative layer 14 is preferably provided on an upper side of the sheet-shaped base material 12 of a high-frequency dielectric heating adhesive sheet 21 along an arrow A as shown in FIGS. 1C and 1D.

The decorative layer 14, which is in a form of a letter, figure, sign, design, illustration and the like, provides predetermined information to a viewer and gives decoration to an adherend. Although the decorative layer 14 is usually a printed layer formed of a predetermined coating material, the decorative layer 14 may be an embossed layer.

Specifically, the decorative layer 14 is a gravure printing layer, ink-jet layer, intaglio printing layer or embossed layer, which is formed of a coating material containing various coloring agents in various resins such as a urethane resin, acrylic resin, vinyl chloride resin, and silicone resin.

A method of forming the decorative layer in a form of the printed layer may be selected from known methods such as relief printing, intaglio printing, planographic printing, gravure printing, flexo printing, thermal transfer printing, ink-jet printing, and electrostatic printing (toner printing), and embossing technique such as emboss roll processing.

A thickness of the decorative layer 14, which is not particularly limited, may be determined as needed in consideration of types of ink used for printing, a printing method and the like.

Accordingly, the thickness of the decorative layer 14 is usually preferably in a range from 1 to 10 μm.

(3) Surface Protection Layer

Figure 1E:
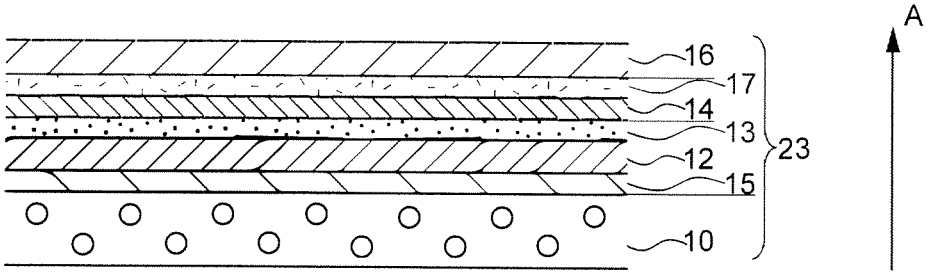
FIG. 1E is an illustration for showing a still further arrangement example of the high-frequency dielectric heating adhesive sheet of the invention.

When the decorative layer 14 is provided on the sheet-shaped base material 12 of a high-frequency dielectric heating adhesive sheet 23 along an arrow A as shown in FIG. 1E, a surface protection layer 16 is preferably provided further on the decorative layer 14.

This is because the surface protection layer 16 protects the decorative layer 14 from stimulation given to the high-frequency dielectric heating adhesive sheet.

Particularly, a material having a strength enough to prevent the printed layer from being damaged or dropping off due to scratch stimulation is preferably used for the surface protection layer 16.

Moreover, the surface protection layer 16 preferably has sufficient light transmission characteristics (e.g., light transmissibility of 80% or more) in order to keep visibility of the decorative layer 14.

Further, in order to modify an appearance of the decorative layer 14 to be glossy, matted or the like, a surface of the surface protection layer 16 may be smooth or uneven (matted).

A material of the surface protection layer 16 is preferably a transparent resin film. Specifically, a transparent film exemplified by a polypropylene film and a polyethylene terephthalate film and having a strength increased by drawing is preferable.

Moreover, the surface protection layer used for a floor marking sheet described later is preferably a transparent polyvinyl chloride film whose surface is matted in order to produce a non-skid effect and a light-scattering effect.

A thickness of the accepting layer 16, which is not particularly limited, may be determined as needed in consideration of types of ink used for printing, a printing method and the like.

Accordingly, a thickness of the surface protection layer 16 is usually preferably in a range from 5 to 100 μm.

(4) Interlayer Adhesive Layer

As shown in FIG. 1B or 1E, in order to bond the layers of the high-frequency dielectric heating adhesive sheet 20' or bond the layers of the high-frequency dielectric heating adhesive sheet 23 and adjacent layers, or to reinforce an adhesion strength between the layers, interlayer adhesive layers (sometimes referred to as the adhesive layers) 15 and 17 are also preferably provided.

Particularly, it is preferable that the interlayer adhesive layer 15 is provided between the sheet-shaped base material 12 and the high-frequency dielectric adhesive layer 10 as shown in FIG. 1B or 1E, and the interlayer adhesive layer 17 is provided between the surface protection layer 16 and the decorative layer 14 as shown in FIG. 1E.

The interlayer adhesive layer (i.e., the second adhesive layer) 15 thus provided between the sheet-shaped base material 12 and the high-frequency dielectric adhesive layer 10 is preferably a thermoplastic adhesive, thermosetting adhesive, pressure-sensitive adhesive and the like.

Each of the thermosetting adhesive and the pressure-sensitive adhesive is supplied in a form of a coating liquid prepared by dissolving or dispersing components of the additive in water or an organic solvent. In order to provide the interlayer adhesive layer, preferably, the coating liquid is applied on the sheet-shaped base material 12 and dried to provide a laminate of the two layers.

Moreover, the thermoplastic adhesive may be extruded into a film, or may be dissolved or dispersed in an organic solvent or the like to provide a coating liquid and the coating liquid may be applied and dried to provide the interlayer adhesive layer.

The interlayer adhesive layer (i.e., the first adhesive layer) 17 provided between the surface protection layer 16 and the decorative layer 14 is preferably formed of a transparent pressure-sensitive adhesive in order to securely visually check the decorative layer 14.

Moreover, any resin having a sufficient adhesion strength is usable as the thermoplastic resin for forming the interlayer adhesive layers 15, 17.

Specific examples of the thermoplastic resin include an ethylene vinyl acetate copolymer, ethylene(meth)acrylic acid copolymer, ethylene(meth)acrylic acid ester copolymer, ionomer resin, and chlorinated polyolefin resin.

Specific examples of the thermosetting resin used for the interlayer adhesive layers 15 and 17 include a polyester resin, polyurethane resin, epoxy resin, acrylic resin, and phenol resin.

Specific examples of the pressure-sensitive adhesive used for the interlayer adhesive layers 15 and 17 include an acrylic adhesive, rubber adhesive, silicone adhesive, urethane adhesive, and vinyl ether adhesive.

A thickness of each of the interlayer adhesive layers 15 and 17, which is not particularly limited, may be determined as needed in consideration of components of the interlayer adhesive layers 15 and 17 and types of layers adjacently sandwiching each of the interlayer adhesive layers 15 and 17. The interlayer adhesive layers 15 and 17 may be the same or different in thickness.

Accordingly, the thickness of each of the interlayer adhesive layers 15 and 17 is usually preferably a value in a range from 1 to 50 μm.

4. High-Frequency Dielectric Heating Adhesive Sheet (1) Arrangement Example

An arrangement example of the high-frequency dielectric heating adhesive sheet will be specifically described below with reference to the attached drawings.

(1)-1 Arrangement Example 1

Arrangement Example 1 is the high-frequency dielectric heating adhesive sheet 20 including the sheet-shaped base material 12 and the high-frequency dielectric adhesive layer 10 from an upper side toward a lower side in an opposite direction from the arrow A as shown in FIG. 1A.

Herein, details of the sheet-shaped base material 12 and the high-frequency dielectric adhesive layer 10 are the same as those described in the first exemplary embodiment.

The high-frequency dielectric heating adhesive sheet 20 with the above arrangement, even though the arrangement is simple, can be easily stuck to various adherends in a short time by subjecting the high-frequency dielectric heating adhesive sheet 20 to high-frequency dielectric heating.

(1)-2 Arrangement Example 2

Arrangement Example 2 is the high-frequency dielectric heating adhesive sheet 21 including the decorative layer 14, the sheet-shaped base material 12 and the high-frequency dielectric adhesive layer 10 sequentially from an upper side toward a lower side in an opposite direction from the arrow A as shown in FIG. 1C.

The high-frequency dielectric heating adhesive sheet 21 with the above arrangement, which can form a decorative sheet having no surface tack, can be easily stuck to an adherend, even when the area of the high-frequency dielectric heating adhesive sheet 21 is relatively large.

(1)-3 Arrangement Example 3

Arrangement Example 3 is the high-frequency dielectric heating adhesive sheet 22 including the decorative layer 14, the accepting layer 13, the sheet-shaped base material 12 and the high-frequency dielectric adhesive layer 10 sequentially from an upper side toward a lower side in an opposite direction from the arrow A as shown in FIG. 1D.

The high-frequency dielectric heating adhesive sheet 22 with the above arrangement, in which the decorative layer 14 is provided on an upper surface of the accepting layer 13, can significantly improve durability and formability of the decorative layer 14. In other words, the accepting layer 13 is a layer for stably forming a predetermined decorative layer 14 on an upper side of the sheet-shaped base material 12 and improving adhesiveness between the decorative layer 14 and the sheet-shaped base material 12.

(1)-4 Arrangement Example 4

Arrangement Example 4 is the high-frequency dielectric heating adhesive sheet 23 including the surface protection layer 16, the interlayer adhesive layer (the first adhesive layer) 17, the decorative layer 14, the accepting layer 13, the sheet-shaped base material 12, the interlayer adhesive layer (the second adhesive layer) 15, and the high-frequency dielectric adhesive layer 10 sequentially from an upper side toward a lower side in an opposite direction from the arrow A as shown in FIG. 1E.

The high-frequency dielectric heating adhesive sheet 23 with the above arrangement, in which the surface protection layer 16 is provided through the interlayer adhesive layer (the first adhesive layer) 17, can significantly improve durability of the surface protection layer 16. If only the surface protection layer 16 is deteriorated, the deteriorated surface protection layer 16 is peeled at an interface with the interlayer adhesive layer 17 on an upper side of the decorative layer 14 and is replaceable by a new surface protection layer 16.

As shown in the high-frequency dielectric heating adhesive sheet 23 (Arrangement Example 4) shown in FIG. 1E, another interlayer adhesive layer (the second adhesive layer) 15 is preferably provided between the sheet-shaped base material 12 and the high-frequency dielectric adhesive layer 10.

This is because the thus provided interlayer adhesive layer 15 can significantly improve an adhesive force between the layers, and consequently significantly improve the durability of the high-frequency dielectric heating adhesive sheet 23.

(1)-5 Other Arrangement Example

As an arrangement example of the high-frequency dielectric heating adhesive sheet, although not shown in the drawings, at least one of a hard coat layer, antistatic layer, electric insulating layer or the like may be provided on an opposite surface of the surface protection layer 16 from the sheet-shaped base material, and/or may be provided between any ones of the layers provided between the surface protection layer 16 and the high-frequency dielectric adhesive layer 10.

(2) Surface Tack

The high-frequency dielectric heating adhesive sheet with use of the above-described high-frequency dielectric adhesive layer can be an adhesive sheet having no predetermined surface tack and not requiring a releasable sheet.

Herein, whether the high-frequency dielectric adhesive layer has a predetermined surface tack is determined by an inclined ball tack test. In the inclined ball tack test, it is preferable that the level of the high-frequency dielectric adhesive layer is less than 2, in other words, a steel ball having a diameter of 2/32 inch slides on without stopping on a 10-cm long high-frequency dielectric adhesive layer placed on a 30-degree inclined surface.

When the high-frequency dielectric heating adhesive sheet having a predetermined surface tack is formed into a roll without using a releasable sheet, the high-frequency dielectric adhesive layer sticks to a surface in contact therewith, so that it may become difficult to stably unroll or handle the high-frequency dielectric heating adhesive sheet.

(3) Application Example of High-Frequency Dielectric Heating Adhesive Sheet

Application examples of the high-frequency dielectric heating adhesive sheet of the invention are not particularly limited. The high-frequency dielectric heating adhesive sheet is usable for various applications where an adhesive sheet or a sticking sheet is used.

The application examples include a printing label, signboard marking sheet, floor marking sheet, road surface marking sheet, furniture decoration sheet, decoration sheet for home electric appliances, vehicle interior-exterior finishing sheet, ship interior-exterior finishing sheet, airplane interior-exterior finishing sheet for, vehicle interior sheet, building sheet, wall sheet, partition sheet, door decoration sheet, and road sign sheet.

Among the above application examples, particularly when an adhesion area of the high-frequency dielectric heating adhesive sheet to an adherend is large and an adhesion operation is conducted at a working site, positional misalignment does not occur by a peeling operation since no releasable sheet is provided, and the high-frequency dielectric heating adhesive sheet is excellent in workability (e.g., positioning) since the high-frequency dielectric heating adhesive sheet has no surface tack.

Accordingly, among the above application examples of the high-frequency dielectric heating adhesive sheet, floor marking sheet and road surface marking sheet (hereinafter, collectively referred to as a floor marking sheet) are particularly preferable.

An adhesive sheet-type floor marking sheet is well known. The floor marking sheet, which is often stuck to a passage and a road surface in downtown so as to be looked at by many passersby, requires an adhesive agent (sticking agent) having a strong adhesive force since many people passes through on the floor marking sheet.

Figure 8:
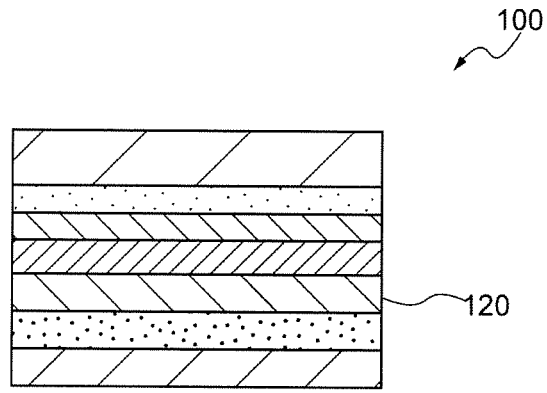
FIG. 8 is an illustration for showing an arrangement of a typical floor marking sheet (adhesive type).

Accordingly, in order to increase an adhesive force between a typical floor marking sheet 100 as shown in FIG. 8 and a floor surface or a road surface (i.e., adherend), the floor surface or the road surface before sticking of the floor marking sheet 100 has been subjected to a primer treatment in advance.

Moreover, in the typical floor marking sheet 100, in order to improve the adhesive force to the floor surface or the road surface, it is inevitable to hit a surface of the floor marking sheet 100 with a hammer to fit the surface of the floor marking sheet 100 to undulation of the floor surface or the road surface. Specifically, immediately after the typical floor marking sheet 100 whose layer includes a stretchable metal foil 120, is stuck to the floor surface or the road surface, the metal foil 120 needs to be deformed.

In contrast, when the high-frequency dielectric heating adhesive sheet of the invention is used as the floor marking sheet, a temperature of the thermoplastic resin of the high-frequency dielectric adhesive layer through dielectric heating exceeds the melting point or the softening point to exhibit a sufficient fluidity. Accordingly, without the treatment for fitting the high-frequency dielectric heating adhesive sheet to undulation of the floor surface or the road surface, the high-frequency dielectric heating adhesive sheet of the invention can be fitted to undulation of the floor surface or the road surface, so that the high-frequency dielectric heating adhesive sheet can exhibit a sufficient adhesive force.

The high-frequency dielectric heating adhesive sheet is applicable to any usage to which the dielectric heating is applicable.

(4) Manufacturing Example of High-Frequency Dielectric Heating Adhesive Sheet

Typical Manufacturing Examples 1 to 4 of the high-frequency dielectric adhesive layer and the high-frequency dielectric heating adhesive sheet are shown below. The Manufacturing Examples 1 to 4 may be modified as needed depending on usage and the details of the high-frequency dielectric heating adhesive sheet.

(4)-1 Manufacturing Example 1

Firstly, a manufacturing method of a single high-frequency dielectric adhesive layer for forming high-frequency dielectric heating adhesive sheet will be described as Manufacturing Example 1.

The high-frequency dielectric adhesive layer can be manufactured by various film extruders. Specifically, the component A in a form of a thermoplastic resin component and the component B in a form of a dielectric filler are preliminarily mixed at a predetermined ratio, and melted and kneaded at a predetermined temperature by a twin screw extruder or the like to prepare pellets. The obtained pellets are put into an extruder or the like provided with a discharge outlet (e.g., T-die), melted and kneaded at a predetermined temperature, and extruded from the discharge outlet to form a film. The film is cooled under predetermined conditions and winded by a winding device, so that the high-frequency dielectric adhesive layer in a single layer is obtained.

(4)-2 Manufacturing Example 2

Next, the high-frequency dielectric heating adhesive sheet 20 including the sheet-shaped base material 12 and the high-frequency dielectric adhesive layer 10 in Manufacturing Example 2 (Manufacturing Examples 2-1 to 2-4) shown in FIG. 1A will be described.

Firstly, in Manufacturing Example 2-1, the high-frequency dielectric heating adhesive sheet shown in FIG. 1A is manufactured by extrusion lamination.

Specifically, an extruder provided with an unrolling device, winding device, and discharge outlet (e.g., T-die) is prepared. The sheet-shaped base material 12 is placed in a manner to extend from the unrolling device to the winding device.

Next, pellets obtained in the same manner as in Manufacturing Example 1 are melted and kneaded at a predetermined temperature, and extruded from the discharge outlet provided above a delivery path of the sheet-shaped base material to coat a predetermined surface of the sheet-shaped base material 12.

The obtained laminate is cooled under predetermined conditions and winded with the winding device, so that the high-frequency dielectric heating adhesive sheet 20 having an arrangement shown in FIG. 1A is obtained.

In Manufacturing Example 2-2, the high-frequency dielectric heating adhesive sheet shown in FIG. 1A is manufactured by co-extrusion.

Specifically, pellets obtained in the same manner as in Manufacturing Example 1 and resin pellets (raw material) for the sheet-shaped base material 12 are separately prepared.

An extruder provided with a multi-layer die as the discharge outlet is prepared. The above pellets are melted and kneaded at a predetermined temperature, extruded in a laminate state from the multi-layer die, and winded while being cooled, so that the high-frequency dielectric heating adhesive sheet 20 having the arrangement shown in FIG. 1A is obtained.

Manufacturing Example 2-2 is applicable when the sheet-shaped base material 12 is made of a thermoplastic resin and can be formed by extrusion.

In Manufacturing Example 2-3, the high-frequency dielectric heating adhesive sheet shown in FIG. 1A is manufactured by heating adhesion.

Specifically, the single high-frequency dielectric adhesive layer 10 obtained in Manufacturing Example 1 and the sheet-shaped base material 12 are prepared. Meanwhile, a predetermined laminate device having a heat-applicable press roller is prepared. The sheet-shaped base material 12 and the single high-frequency dielectric adhesive layer 10 mutually adhere on each other by thermal compression bond.

In Manufacturing Example 2-4, the high-frequency dielectric heating adhesive sheet shown in FIG. 1A is manufactured through high-frequency dielectric heating.

Specifically, the single high-frequency dielectric adhesive layer 10 obtained in Manufacturing Example 1 and the sheet-shaped base material 12 are prepared. Meanwhile, a predetermined laminate device having the press roller and a high-frequency application device is prepared. The sheet-shaped base material 12 and the single high-frequency dielectric adhesive layer 10 mutually adhere on each other by high-frequency thermal compression bond.

(4)-3 Manufacturing Example 3

Next, a high-frequency dielectric heating adhesive sheet 20' including the sheet-shaped base material, the interlayer adhesive layer and the high-frequency dielectric adhesive layer, which are layered in this order, in Manufacture Example 3 (Manufacture Examples 3-1 to 3-4) shown in FIG. 1B will be described.

The adhesion strength between the sheet-shaped base material and the high-frequency dielectric adhesive layer can be increased by forming the interlayer adhesive layer. Consequently, interlayer peeling, which is caused by lowered cohesion force due to a high temperature by the high-frequency application on the high-frequency dielectric adhesive layer, can be prevented.

In Manufacturing Example 3-1, the high-frequency dielectric heating adhesive sheet 20' shown in FIG. 1B is manufactured by co-extrusion lamination.

Specifically, an extruder provided with an unrolling device, winding device, and discharge outlet (e.g., multi-layer die) is prepared. The sheet-shaped base material is placed from the unrolling device to the winding device. Next, the pellets obtained in the same manner as in Manufacturing Example 1 and resin pellets (raw material) for the interlayer adhesive layer are melted and kneaded at respective predetermined temperatures, extruded from the discharge outlet provided above a delivery path of the sheet-shaped base material to form a laminate of the interlayer adhesive layer and the high-frequency dielectric adhesive layer on a predetermined surface of the sheet-shaped base material 12. The obtained laminate is cooled under predetermined conditions and winded with the winding device, so that a high-frequency dielectric heating adhesive sheet having a predetermined arrangement is obtained.

Manufacturing Example 3-2 is another example for obtaining the high-frequency dielectric heating adhesive sheet 20' shown in FIG. 1B by three-layer co-extrusion.

Specifically, the pellets obtained in the same manner as in Manufacturing Example 1, the resin pellets for the interlayer adhesive layer, and the resin pellets for the sheet-shaped base material are prepared.

An extruder provided with a multi-layer die as the discharge outlet is prepared. The above pellets are melted and kneaded at respective predetermined temperatures, extruded in a predetermined laminate state from the multi-layer die, and winded while being cooled, so that a high-frequency dielectric heating adhesive sheet having a predetermined arrangement is obtained.

Manufacturing Example 3-3 is still another example for obtaining the high-frequency dielectric heating adhesive sheet 20' shown in FIG. 1B by layering the interlayer adhesive layer 15 made of a coating-type adhesive using a coater.

Specifically, while the high-frequency dielectric adhesive layer is prepared based on Manufacturing Example 1, the sheet-shaped base material, a first unrolling device, a second unrolling device, the winding device, and a coater provided with a coating head and a heating dryer are prepared.

Next, a first one of the sheet-shaped base material and a high-frequency dielectric adhesive film is placed in a manner to extend over the first unrolling device and the winding device while a second one of the sheet-shaped base material and the high-frequency dielectric adhesive film is placed at the second unrolling device.

Next, the coating head, which is disposed between the first unrolling device and the heating dryer, applies the coating-type adhesive for forming the interlayer adhesive layer 15 on the first one of the sheet-shaped base material and the high-frequency dielectric adhesive film, and subsequently the applied coating-type adhesive (i.e., the interlayer adhesive layer 15) is dried with the heating dryer.

It is also preferable that the interlayer adhesive layer 15 is further heated to be crosslinked, as needed.

Next, the second one of the sheet-shaped base material and the high-frequency dielectric adhesive film is delivered from the second unrolling device, pasted on a surface of the dried interlayer adhesive layer 15 and winded by the winding device to obtain a high-frequency dielectric heating adhesive sheet having a predetermined arrangement.

Manufacturing Example 3-4 is a further example for obtaining the high-frequency dielectric heating adhesive sheet 20' shown in FIG. 1B through adhesion lamination.

Specifically, while the high-frequency dielectric adhesive layer is prepared based on Manufacturing Example 1 and the sheet-shaped base material and a releasable sheet are prepared, the same coater used in Manufacturing Example 3-3 is prepared.

Next, the releasable sheet is placed in a manner to extend over the first unrolling device and the winding device while a first one of the sheet-shaped base material and the high-frequency dielectric adhesive layer is placed at the second unrolling device.

Subsequently, the coating head, which is disposed between the first unrolling device and the heating dryer, is used for forming the interlayer adhesive layer 15 made of the pressure-sensitive adhesive (sticking agent).

The coating-type adhesive is applied on the releasable sheet and subsequently is dried with the heating dryer. It is also preferable that the adhesive is further heated to be crosslinked, as needed.

Then, the first one of the sheet-shaped base material and the high-frequency dielectric adhesive layer placed at the second unrolling device is delivered therefrom, pasted on a surface of the dried interlayer adhesive layer (adhesive layer) 15 and winded by the winding device to obtain the sheet-shaped base material provided with the adhesive layer or the high-frequency dielectric adhesive layer provided with the adhesive layer.

Next, after curing of the adhesive is completed, the releasable sheet is removed. The first one of the sheet-shaped base material and the high-frequency dielectric adhesive layer is pasted on the remainder of the sheet-shaped base material and the high-frequency dielectric adhesive layer, so that a high-frequency dielectric heating adhesive sheet having a predetermined arrangement can be obtained.

According to the high-frequency dielectric heating adhesive sheet obtained in Manufacturing Example 3-4, the releasable sheet, which has been used during manufacturing, is removed to be absent in use, specifically, in an adhesion step of the high-frequency dielectric heating adhesive sheet to an adherend in a high-frequency heating. Accordingly, the obtained high-frequency dielectric heating adhesive sheet is easily handled in the same manner as in other Manufacturing Examples.

Since the high-frequency dielectric heating adhesive sheet can be stored for a long time in a state of a half-finished product, the high-frequency dielectric heating adhesive sheet 20' can contribute to an improvement in productivity even when the high-frequency dielectric heating adhesive sheet 20' is used a wide variety of products in small amounts due to a wide variety of types of the raw material.

(4)-4 Manufacturing Example 4

Next, in Manufacturing Example 4, a step of layering the accepting layer 13, the decorative layer 14 and the surface protection layer 16 will be individually described.

Firstly, a coating agent for forming the accepting layer 13 is applied using a predetermined coater directly on the sheet-shaped base material 12 or on the sheet-shaped base material of one of the double-layered laminate shown in FIG. 1A and the three-layered laminate shown in FIG. 1B, and dried or hardened to form the accepting layer 13.

Herein, the coater is not particularly limited. Any coater provided with the coating head suitably usable for a coating agent forming the accepting layer is usable.

Next, when the decorative layer 14 is provided in a form of a printing, the printing is applied directly on the sheet-shaped base material 12 or on the sheet-shaped base material of one of the double-layered laminate shown in FIG. 1A and the three-layered laminate shown in FIG. 1B to form the decorative layer 14. Herein, any materials and devices suitable for drawn expressions may be selected as needed in terms of types of the used printing ink, the printing device and the like.

However, when the decorative layer 14 is provided in a form of an embossed layer, the decorative layer 14 can be provided by embossing the sheet-shaped base material or by casting a liquid raw material of the sheet-shaped base material in a casting sheet having an inversed embossed surface.

Next, the surface protection layer 16 may be formed by directly applying a transparent coating material (i.e., clear coat) on the decorative layer and subsequently hardening the transparent coating material, or may be formed by pasting transparent pressure-sensitive adhesive sheets (forming the surface protection layer 16 and the interlayer adhesive layer 17) at respective predetermined positions at room temperature to form the surface protection layer 16 at a predetermined position on a high-frequency dielectric heating adhesive sheet.

Second Exemplary Embodiment

A second exemplary embodiment provides an adhesion method of a high-frequency dielectric heating adhesive sheet including a sheet-shaped base material and a high-frequency dielectric adhesive layer, the adhesion method including Steps (1) and (2) below.

In Step (1), the high-frequency dielectric adhesive layer, which includes a thermoplastic resin as a component A and a dielectric filler as a component B, is formed on the sheet-shaped base material, thereby forming the high-frequency dielectric heating adhesive sheet.

In Step (2), the high-frequency dielectric heating adhesive sheet is subjected to high-frequency dielectric heating to adhere on an adherend.

The adhesion method of the high-frequency dielectric heating adhesive sheet in the second exemplary embodiment will be described mainly in terms of differences from that in the first exemplary embodiment.

1. Step (1)

In Step (1), the high-frequency dielectric adhesive layer is formed on the sheet-shaped base material, thereby forming the high-frequency dielectric heating adhesive sheet.

It should be noted that the details, the manufacturing method and the like of the sheet-shaped base material, the high-frequency dielectric adhesive layer, and the high-frequency dielectric heating adhesive sheet can be rendered the same as those in the first exemplary embodiment.

2. Step (2)

(1) Adherend

In Step (2), the high-frequency dielectric heating adhesive sheet is placed at a predetermined position on the adherend and is subjected to high-frequency dielectric heating to adhere on the adherend.

At this time, it is usually preferable to cut the high-frequency dielectric heating adhesive sheet into a predetermined shape depending on an intended use and place the cut high-frequency dielectric heating adhesive sheet at the predetermined position on the adherend.

The details of the adherend are not particularly limited. Any materials of the adherend usable for various application examples are usable.

More specifically, the adherend may be made of various materials of organic materials and inorganic materials (including metallic materials and the like), and further may be made of composite materials of the organic materials and/or the inorganic materials.

Examples of the organic materials forming the adherend include: a plastic material such as a polypropylene resin, polyethylene resin, acrylonitrile-butadiene-styrene copolymer resin (ABS resin), polycarbonate resin, polyamide resin such as nylon 6 and nylon 66, polybutylene terephthalate resin (PBT resin), polyacetal resin (POM resin), polymethyl methacrylate resin, polystyrene resin and the like; and a rubber material such as styrene-butadiene rubber (SBR), ethylene propylene rubber (EPR), silicone rubber and the like.

Moreover, a fiber-reinforced resin (FRP) that is a composite material of glass fiber and the above plastic material is also a preferable material of the adherend.

When the high-frequency dielectric heating adhesive sheet is used as a floor marking sheet and a road surface marking sheet, the adherend may be made of a floor material or a road surface material (e.g., asphalt, concrete, stone and tile), or other materials for a floor, stairs, an exterior wall and the like.

(2) Dielectric Heating

In Step (2), a high-frequency dielectric heating adhesion device (hereinafter, sometimes referred to as a dielectric heating adhesion device) 50, 50' exemplarily shown in FIG. 5 or 6 applies dielectric heating to the high-frequency dielectric heating adhesive sheet under predetermined conditions (e.g., under a high-frequency output of from 0.1 to 20 kW and an application duration of 1 second to less than 120 seconds).

The dielectric heating adhesion device used in Step (2) and conditions for the dielectric heating will be described below.

(2)-1 Dielectric Heating Adhesion Device

Figure 5:
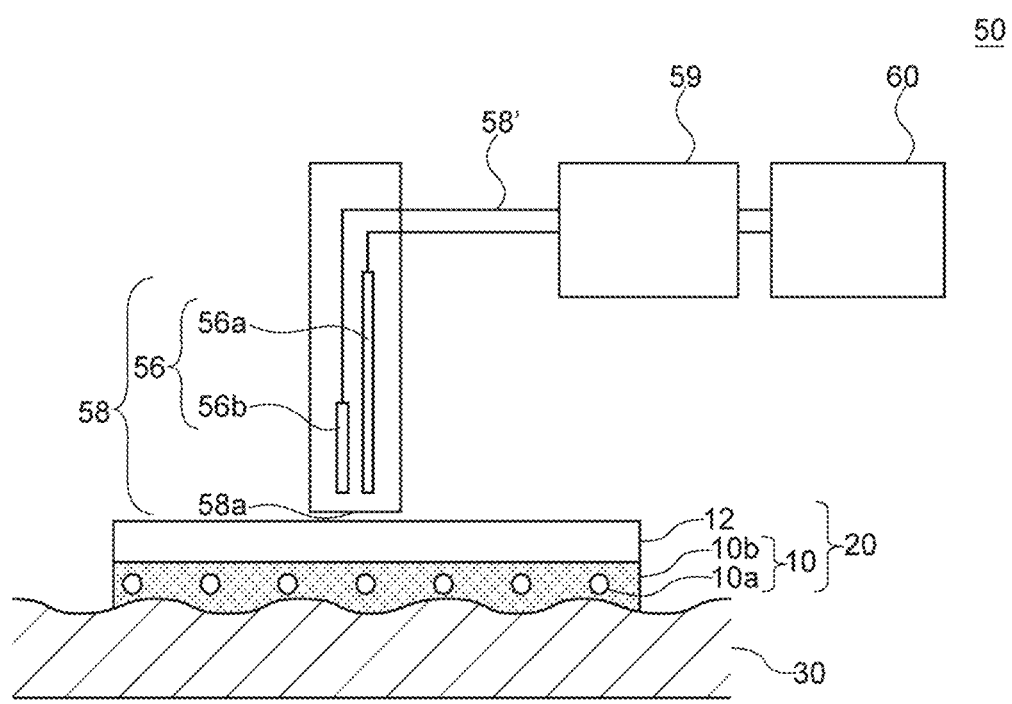
FIG. 5 is an illustration for showing a dielectric heating adhesion method using a predetermined one-side high-frequency dielectric heating device.

As shown in FIG. 5, while the dielectric heating adhesion device 50 applies dielectric heating to the high-frequency dielectric heating adhesive sheet 20 through the high-frequency dielectric adhesive layer 10 held between the sheet-shaped base material 12 and an adherend 30 (a floor surface or a paved surface), the dielectric heating adhesion device 50 applies pressure to the high-frequency dielectric heating adhesive sheet 20 with an end 58a of an electrode unit, whereby the high-frequency dielectric heating adhesive sheet 20 adheres to the adherend 30.

The dielectric heating adhesion device 50 includes an electric power source 60 and a high-frequency wave generator 59 for applying a high-frequency wave, for instance, at a frequency of about 28 MHz or 40 MHz to each of a first high-frequency electrode 56a and a second high-frequency electrode 56b which face each other.

When a high-frequency electric field is applied to between the first high-frequency electrode 56a and the second high-frequency electrode 56b, a dielectric filler 10a evenly dispersed in the high-frequency dielectric adhesive layer 10 absorbs high-frequency energy.

Further, the dielectric filler 10a also serves as a heat generation source. Heat generated by the dielectric filler 10a melts a thermoplastic resin 10b forming a part of the high-frequency dielectric adhesive layer 10, allowing the high-frequency dielectric heating adhesive sheet 20 to finally adhere to the adherend 30.

Accordingly, as shown in FIG. 5, the high-frequency dielectric heating adhesive sheet 20 can firmly adhere to the adherend 30 having surface undulation by being pressurized by the end 58a (also serving as a press machine) of the electrode unit in addition to heating and melting of the high-frequency dielectric adhesive layer 10.

Figure 6:
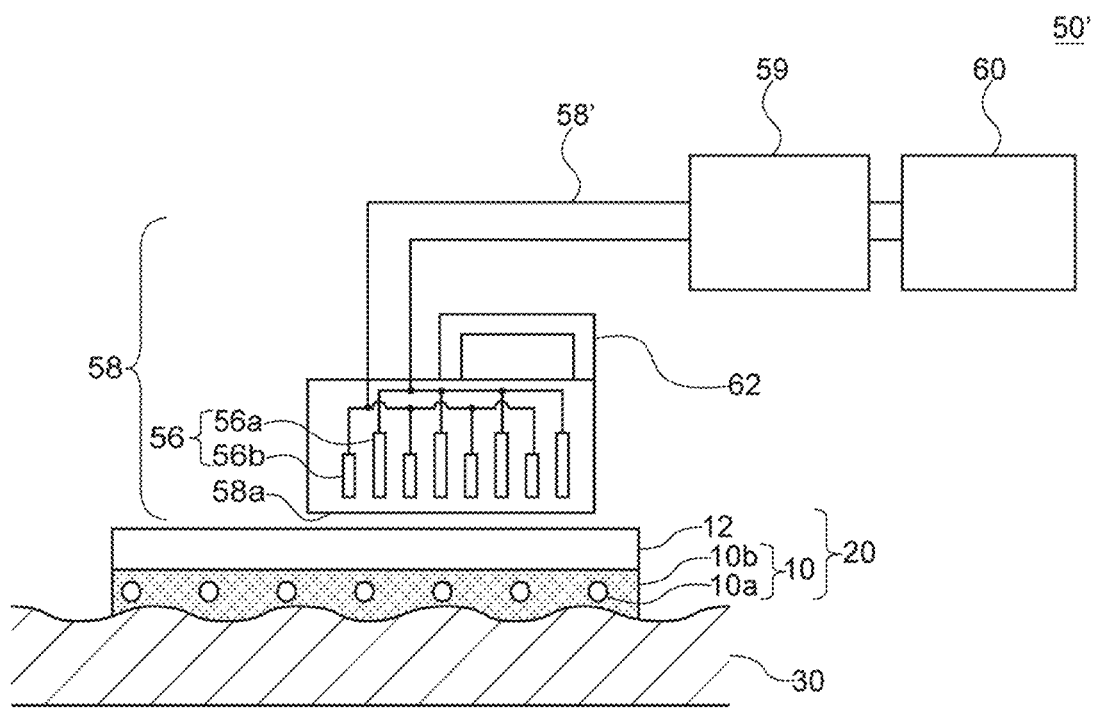
FIG. 6 is an illustration for showing a dielectric heating adhesion method using a one-side high-frequency dielectric heating device provided with a grid electrode.

Further, a one-side high-frequency dielectric heating device including an electrode (grid electrode) 56, in which a plurality of first high-frequency electrodes 56a and a plurality of second high-frequency electrodes 56b (opposite pole) are alternately arranged, is preferably used as a dielectric heating adhesion device 50' as shown in FIG. 6.

In other words, the electrode unit 58 is shaped flat, and an end of the grid electrode 56, where no electric connection is established with a wire 58' and is opposite from an end of the grid electrode 56 electrically connected to the wire 58', is disposed close to the bottom of the electrode unit 58.

With this arrangement of the electrode unit 58, a high frequency wave applied by the grid electrode 56 draws a loop in a wider plane, so that an electric force line penetrates the high-frequency dielectric heating adhesive sheet 20 in a wide area.

Accordingly, since an area of the end 58a of the electrode unit 58 in contact with an adherend having a relatively large area becomes large, an adhesion operation can be efficiently conducted on the adherend.

As shown in FIG. 6, a handle 62 or a predetermined projection (not shown) is provided on a predetermined surface opposite from the end 58a (i.e., the bottom) of the electrode unit 58 to impart handleability, as given by a clothes iron, to the electrode unit 58. With the above arrangement, manual handleability of the one-side dielectric heating adhesion device 50' is further enhanced.

Moreover, since the end 58a (i.e., the bottom) of the electrode unit 58 is subjected to a high temperature, a plate-shaped member made of a heat-resistant material having a low permittivity (e.g., Teflon (registered trade mark) that is tetrafluoroethylene resin, a silicone resin and the like) is used.

(2)-2 Dielectric Heating Conditions

Dielectric heating conditions are changeable as needed. However, the high-frequency output is preferably a value in a range from 0.1 to 20 kW, more preferably from 0.2 to 10 kW, further preferably from 0.2 to 5 kW.

Moreover, the application duration of the high-frequency wave is preferably a value in a range from 1 second to less than 120 seconds, more preferably from 5 to 100 seconds, further preferably from 10 to 80 seconds.

Further, the frequency of the high-frequency wave is preferably a value in a range from 1 to 100 MHz, more preferably from 5 to 80 MHz, further preferably from 10 to 50 MHz. Specifically, frequency bands 13.56 MHz, 27.12 MHz and 40.68 MHz allocated by International Telecommunication Union are used in the dielectric adhesive method of the invention.

EXAMPLES

Example 1

1. Preparation of High-Frequency Dielectric Heating Adhesive Sheet (1) Preparation of Dielectric Heating Adhesive Film As a first one of the component A, 50 parts by mass of a random polypropylene resin (manufactured by Prime Polymer Co., Ltd. Prime Polypro N-744NP, melting point: 130 degrees C., MFR: 7 g/10 minutes, heat of fusion: 60 J/g, denoted by A1 in Table 1) was prepared.

As a second one of the component A, 50 parts by mass of a crystalline polyester resin (manufactured by TOYOBO CO., LTD. VYLON GM-915, melting point: 139 degrees C., heat of fusion: 7 J/g, weight average molecular weight: 45000, denoted by A2 in Table 1) was prepared.

Further, as the component B, 69 parts by mass of zinc oxide (manufactured by SAKAI CHEMICAL INDUSTRY CO., LTD., LPZINC11, mean particle size: 11 μm, specific gravity: 5.6, denoted by B1 in Table 1) was prepared.

Next, after being preliminary mixed, the above components were supplied into a hopper of a twin screw extruder having a 30-mm-diameter screw, in which a cylinder temperature was set in a range from 180 to 200 degrees C. and a die temperature was set at 200 degrees C., and melted and kneaded.

Subsequently, the melted and kneaded substance was water-cooled and provided in a form of granular pellets through a pelletizer.

Next, the obtained granular pellets were put into a hopper of a single screw extruder provided with a T-die. Under conditions that a cylinder temperature was set at 200 degrees C. and a die temperature was set at 200 degrees C., the melted and kneaded substance was extruded in a form of 400-μm thick film and cooled down to the room temperature, so that a dielectric heating adhesive film was obtained.

(2) Preparation of High-Frequency Dielectric Heating Adhesive Sheet

A 50-μm thick polyvinyl chloride film provided with a 30-μm thick acrylic adhesive layer (second acrylic adhesive layer), which were formed in advance, was layered on the obtained dielectric heating adhesive film.

Next, a 1-μm thick decorative layer was formed with an inkjet printer on an exposure surface of the polyvinyl chloride film, specifically, a surface of the polyvinyl chloride film opposite from a surface where the second acrylic adhesive layer was provided (a first laminate).

Subsequently, a surface of another 200-μm thick polyvinyl chloride film provided with a 30-μm thick acrylic adhesive layer (first acrylic adhesive layer), which were formed in advance, was embossed to prepare an adhesive-added protection film (second laminate).

Then, the second laminate was layered on the decorative layer of the first laminate through the first acrylic adhesive layer, so that a high-frequency dielectric heating adhesive sheet for floor marking was obtained.

Figure 7A:
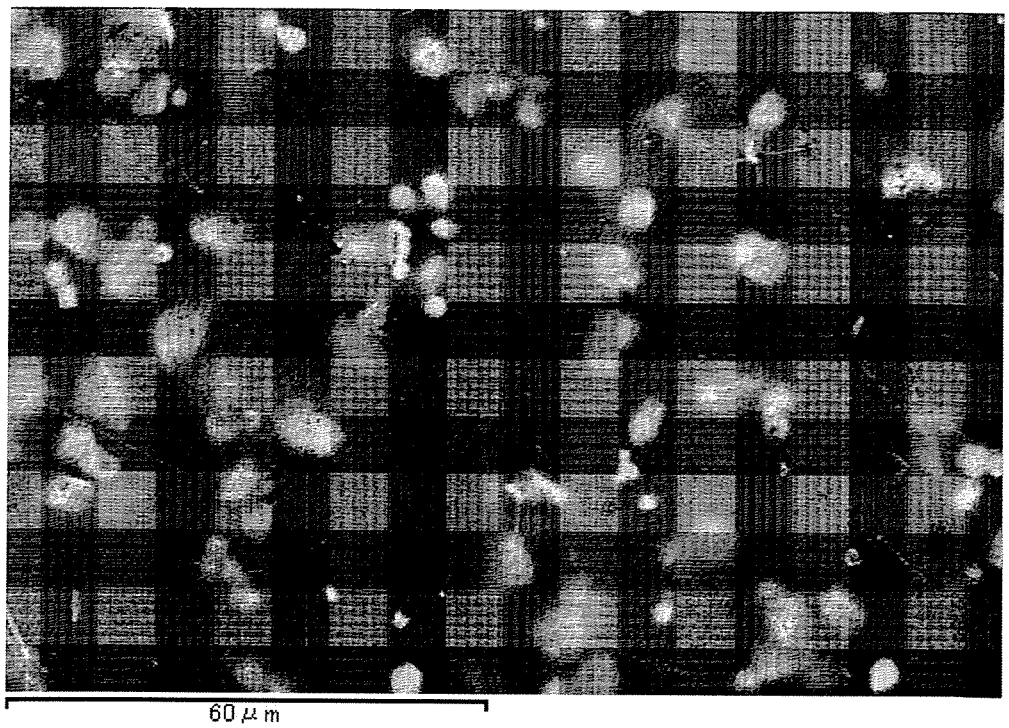
FIG. 7A shows a surface and a cross section of a dielectric heating adhesive film (photographs of 150-power magnifications) used for manufacturing an adhesive structure of the invention.
Figure 7B:
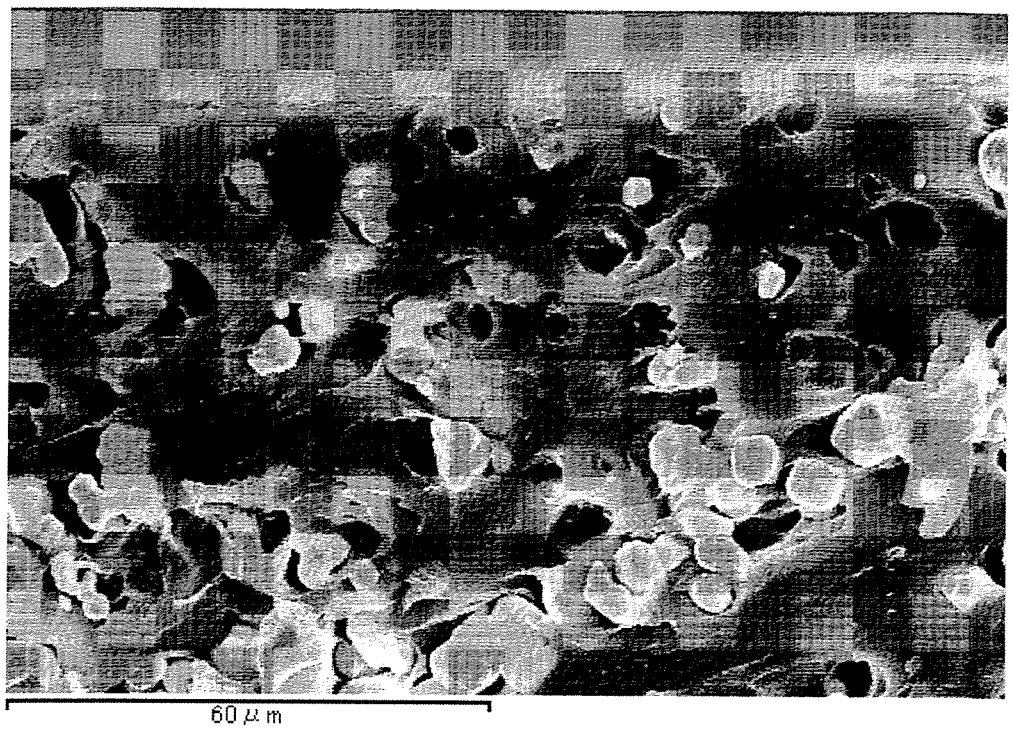
FIG. 7B shows a surface and a cross section of another dielectric heating adhesive film (photographs of 150-power magnifications) used for manufacturing the adhesive structure of the invention.

FIGS. 7A and 7B show a surface and a cross section of the obtained dielectric heating adhesive film (photographs of 150-power magnifications) for reference.

3. Evaluation of High-Frequency Dielectric Heating Adhesive Sheet (1) Surface Adhesiveness (Evaluation 1)

Surface adhesiveness of the exposure surface of the dielectric heating adhesive film in the high-frequency dielectric heating adhesive sheet was measured in accordance with an inclined ball tack method (J. Dow method).

Specifically, it was confirmed by the inclined ball tack test that the surface adhesiveness was at the level of a steel ball of less than No. 2, In other words, a steel ball having a diameter of 2/32 inch (No. 2) slid on without stopping on a 10-cm long high-frequency dielectric adhesive layer placed on a 30-degree inclined surface.

(2) High-Frequency Adhesiveness (Evaluation 2)

A mortar test piece (manufactured by K.K. YUKON Shokai, ISO standard sand, size: 10 mm×70 mm×150 mm) was prepared as an adherend.

Next, the high-frequency dielectric heating adhesive sheet cut in a predetermined size was placed on the mortar test piece with the second laminate being exposed.

Next, a high-frequency dielectric heating adhesion device, Techno Iron-400 (manufactured by YAMAMOTO VINITA CO., LTD) applied a high-frequency wave under the frequency of 40 MHz and the high-frequency output of 0.4 kW in a variety of dielectric heating times, whereby the adhesive film adhered to the adherend to prepare a test piece.

An adhesive force of the obtained test piece was measured and evaluated in terms of the high-frequency adhesiveness according to the following standard.

A: The test piece adhered to the adherend through the dielectric heating for less than 80 seconds.
B: The test piece adhered to the adherend through the dielectric heating for from 80 seconds to less than 100 seconds.
C: The test piece adhered to the adherend through the dielectric heating for from 100 seconds to less than 150 seconds.
D: The test piece did not adhere to the adherend even through the dielectric heating for more than 150 seconds.

Example 2

A high-frequency dielectric heating adhesive sheet for floor marking in Example 2 was prepared and evaluated in the same manner as in Example 1 except that random polypropylene resin (Prime Polypro N-744NP, denoted by A1 in Table 1) used in Example 1 was used at 100 parts by mass as only the component A and zinc oxide (LPZINC11, denoted by B1 in Table 1) used in Example 1 was blended at 169 parts by mass as the component B.

Example 3

In Example 3, in order to prepare the first laminate of Example 1, the polyvinyl chloride film as the sheet-shaped base material was replaced by a 75-μm thick cavity-containing polyester synthetic paper provided with accepting layers on both sides (manufactured by Toyobo Co., Ltd., CRISPER K2323).

A 30-μm thick acrylic adhesive layer (first acrylic adhesive layer) was provided. Next, a 1-μm thick decorative layer was formed with an inkjet printer on an exposure surface of the synthetic paper, specifically, on a surface of the synthetic paper opposite from a surface where the first acrylic adhesive layer was provided, whereby the obtained laminate sheet was provided as a high-frequency dielectric heating adhesive sheet of a print label type.

Next, the high-frequency adhesiveness of the obtained high-frequency dielectric heating adhesive sheet was evaluated (evaluation 2) in the same manner as in Example 1 except that the mortar test piece as the adherend was replaced by a polypropylene resin plate (manufactured by Nippon Testpanel Co., Ltd.).

TABLE 1

| | Dielectric Heating Adhesive Film | | Accepting | | |
|---|---|---|---|---|---|
| | ComponentA | ComponentB | Layer | Evaluation 1 | Evaluation 2 |
| Example 1 | A1:50 pts. mass A2:50 pts. mass | B1:69 pts. mass | absent | less than 2 | A |
| Example 2 | A1:100 pts. mass | B1:169 pts. mass | absent | less than 2 | A |
| Example 3 | A1:50 pts. mass A2:50 pts. mass | B1:69 pts. mass | present | less than 2 | A |

Evaluation 1: Surface Adhesiveness (Inclined Ball Tack Test)
Evaluation 2: High-Frequency Adhesiveness

The invention claimed is:
1. A high-frequency dielectric heating adhesive sheet comprising:
   a sheet-shaped base material;
   a high-frequency dielectric adhesive layer; and
   a decorative layer provided on an upper side of the sheet-shaped base material, wherein the high-frequency dielectric adhesive layer comprises: at least one thermoplastic resin as a component A; and a dielectric filler as a component B,
   the component B is a single one or a combination of zinc oxide and silicon carbide (SiC), a mean particle size of the component B measured according to JIS Z 8819-2 (2001) is a value in a range from 1 to 30 μm,
   a content of the component B is in a range from 69 parts by mass to 800 parts by mass relative to 100 parts by mass of the component A, and
   the high-frequency dielectric adhesive layer satisfies a condition (ii) as follows: (ii) a melting point or a softening point measured by a method according to JIS K 7121 (1987) is a value in a range from 80 to 200 degrees C. and a dielectric property (tan δ/ε') obtained by dividing dissipation factor (tan δ) by relative permittivity (ε') is 0.005 or more.
2. The high-frequency dielectric heating adhesive sheet according to claim 1, wherein the high-frequency dielectric adhesive layer satisfies a condition (i) as follows:
(i) heat of fusion measured according to JIS K 7121 (1987) is a value in a range from 1 to 80 J/g.

3. The high-frequency dielectric heating adhesive sheet according to claim 1, wherein
the high-frequency dielectric adhesive layer comprises, as the component A, a first thermoplastic resin having a predetermined solubility parameter (δ1) and a second thermoplastic resin having a solubility parameter (δ2) larger than that of the first thermoplastic resin.

4. The high-frequency dielectric heating adhesive sheet according to claim 1, wherein the component B is zinc oxide.

5. The high-frequency dielectric heating adhesive sheet according to claim 1, wherein
the high-frequency dielectric adhesive layer, the sheet-shaped base material and the decorative layer are layered in this order.

6. The high-frequency dielectric heating adhesive sheet according to claim 1, wherein
the decorative layer is in a form of at least one selected from the group consisting of a letter, figure, sign, design, and illustration.

7. The high-frequency dielectric heating adhesive sheet according to claim 1, wherein
a melt flow rate (MFR) of the component A is a value in a range from 1 g/10 min to 300 g/10 min at a load of 2.16 kg at 230 degrees C.

8. An adhesion method of a high-frequency dielectric heating adhesive sheet, the high-frequency dielectric heating adhesive sheet comprising:
a sheet-shaped base material;
a high-frequency dielectric adhesive layer; and
a decorative layer provided on an upper side of the sheet-shaped base material, wherein the high-frequency dielectric adhesive layer comprises: at least one thermoplastic resin as a component A; and a dielectric filler as a component B,
the component B is a single one or a combination of zinc oxide and silicon carbide (SiC), a mean particle size of the component B measured according to JIS Z 8819-2 (2001) is a value in a range from 1 to 30 μm,
a content of the component B is in a range from 69 parts by mass to 800 parts by mass relative to 100 parts by mass of the component A, and
the high-frequency dielectric adhesive layer satisfies a condition (ii) as follows: (ii) a melting point or a softening point measured by a method according to JIS K 7121 (1987) is a value in a range from 80 to 200 degrees C. and a dielectric property (tan δ/ε') obtained by dividing dissipation factor (tan δ) by relative permittivity (ε') is 0.005 or more,
the adhesion method comprising:
(1) forming the high-frequency dielectric adhesive layer and the decorative layer on the sheet-shaped base material to prepare the high-frequency dielectric heating adhesive sheet; and
(2) subjecting the high-frequency dielectric heating adhesive sheet to high-frequency dielectric heating to adhere on an adherend.

* * * * *